US011855740B2

(12) United States Patent
Zhang et al.

(10) Patent No.: US 11,855,740 B2
(45) Date of Patent: Dec. 26, 2023

(54) LINK FAILURE RECOVERY METHOD AND RELATED DEVICE

(71) Applicant: Huawei Technologies Co., Ltd., Shenzhen (CN)

(72) Inventors: Di Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 395 days.

(21) Appl. No.: 17/174,041

(22) Filed: Feb. 11, 2021

(65) Prior Publication Data

US 2021/0167839 A1   Jun. 3, 2021

Related U.S. Application Data

(63) Continuation of application No. PCT/CN2019/099468, filed on Aug. 6, 2019.

(30) Foreign Application Priority Data

Aug. 11, 2018 (CN) .......................... 201810912312.8

(51) Int. Cl.
*H04B 7/08* (2006.01)
*H04W 76/19* (2018.01)
(Continued)

(52) U.S. Cl.
CPC ........... *H04B 7/088* (2013.01); *H04L 5/0051* (2013.01); *H04W 72/046* (2013.01);
(Continued)

(58) Field of Classification Search
CPC ...... H04B 7/088; H04W 76/19; H04W 76/11; H04W 72/21; H04W 72/046; H04W 74/0833; H04L 5/0051
See application file for complete search history.

(56) References Cited

U.S. PATENT DOCUMENTS

| 2019/0320469 | A1* | 10/2019 | Huang | .................. H04W 72/23 |
| 2019/0349061 | A1* | 11/2019 | Cirik | ..................... H04L 1/1861 |
| 2022/0295304 | A1* | 9/2022 | Matsumura | ........... H04W 16/28 |

FOREIGN PATENT DOCUMENTS

| CN | 107925493 A | 4/2018 |
| WO | 2010140798 A2 | 12/2010 |

(Continued)

OTHER PUBLICATIONS

R1-1807796 MediaTek "Summary 2 on Remaining Issues on Beam Failure Recovery" 3GPP WG1 #93 Busan May 21-25, 2018. (Year: 2018).*

(Continued)

*Primary Examiner* — Basil Ma
(74) *Attorney, Agent, or Firm* — Leydig, Voit & Mayer, Ltd.

(57) ABSTRACT

In the method, a terminal device may send first indication information on a first uplink resource based on information about a spatial relation parameter, to indicate that a link failure occurs in a $i^{th}$ cell in N second cells. The information about the spatial relation parameter is information about a spatial relation parameter used to send a channel and/or a signal of a first cell, and the first uplink resource is an uplink resource of the first cell. Therefore, the network device does not need to configure a plurality of uplink resources that are associated with a plurality of reference signal resources of a second cell and that are used to indicate that a link failure occurs in the second cell, thereby reducing resource overheads.

12 Claims, 7 Drawing Sheets

(51) Int. Cl.
  *H04W 76/11* (2018.01)
  *H04L 5/00* (2006.01)
  *H04W 72/044* (2023.01)
  *H04W 74/08* (2009.01)
  *H04W 72/21* (2023.01)
(52) U.S. Cl.
  CPC ....... *H04W 72/21* (2023.01); *H04W 74/0833* (2013.01); *H04W 76/11* (2018.02); *H04W 76/19* (2018.02)

(56) References Cited

FOREIGN PATENT DOCUMENTS

| WO | 2018128351 A1 | 7/2018 |
| WO | 2018141303 A1 | 8/2018 |

OTHER PUBLICATIONS

Lenovo, Motorola Mobility, "Discussion of remaining details of beam failure recovery," 3GPP TSG RAN WG1 Meeting #93, Busan, Korea, R1-1806354, total 3 pages, 3rd Generation Partnership Project, Valbonne, France (May 21-25, 2018).

NTT DOCOMO, "Remaining issues on beam recovery," 3GPP TSG RAN WG1 Meeting #93, Busan, Korea, R1-1807621, total 5 pages, 3rd Generation Partnership Project, Valbonne, France (May 21-25, 2018).

Huawei, HiSilicon, "Remaing issues on RA resource selection for multi-beam operations," 3GPP TSG-RAN WG2 Meeting 101bis, Sanya, China, R2-1805894, total 3 pages, 3rd Generation Partnership Project, Valbonne, France (Apr. 16-20, 2018).

MediaTek Inc.,"Remaining Issues on Beam Management," 3GPP TSG RAN WG1 Meeting #93, Busan, Korea, R1-1806788, total 7 pages, 3rd Generation Partnership Project, Valbonne, France (May 21-25, 2018).

"3rd Generation Partnership Project;Technical Specification Group Radio Access Network;NR;Physical layer procedures for control (Release 15)," 3GPP TS 38.213 V15.2.0, total 99 pages, 3rd Generation Partnership Project, Valbonne, France (Jun. 2018).

MediaTek Inc., "Summary 1 on Remaing issues on Beam Failure Recovery," 3GPP TSG RAN WG1 Meeting #93 Busan, Korea, R1-1807661, total 26 pages, 3rd Generation Partnership Project, Valbonne, France (May 21-25, 2018).

"3rd Generation Partnership Project; Technical Specification Group Radio Access Network; NR; Medium Access Control (MAC) protocol specification (Release 15)," 3GPP TS 38.321 V15.2.0, total 73 pages, 3rd Generation Partnership Project, Valbonne, France (Jun. 2018).

MediaTek Inc.,"Summary 2 on Remaing issues on Beam Failure Recovery," 3GPP TSG RAN WG1 Meeting #93 Busan, Korea, R1-1807796, total 29 pages, 3rd Generation Partnership Project, Valbonne, France (May 21-25, 2018).

"3rd Generation Partnership Project;Technical Specification Group Radio Access Network;NR;Radio Resource Control (RRC) protocol specification (Release 15)," 3GPP TS 38.331 V15.2.1, total 303 pages, 3rd Generation Partnership Project, Valbonne, France (Jun. 2018).

Huawei, HiSilicon,"Discussion on BFR for SCell," 3GPP TSG RAN WG1 Meeting #94, Gothenburg, Sweden, R1-1809120, total 6 pages, 3rd Generation Partnership Project, Valbonne, France (Aug. 20-24, 2018).

"Remaining issues on DL beam failure recovery," 3GPP TSG RAN WG1 Meeting #92, Athens, Greece, R1-1801722, Total 2 pages, 3rd Generation Partnership Project, Valbonne, France (Feb. 26-Mar. 2, 2018).

"BFR on SCell," 3GPP TSG-RAN WG2, RAN2#102, Busan, Republic of Korea, R2-1806821, pp. 1-2, 3rd Generation Partnership Project, Valbonne, France (May 21-25, 2018).

* cited by examiner

First uplink resource set

Second uplink resource set

QCL information or spatial relation information

Configuration information

LINK FAILURE RECOVERY METHOD AND RELATED DEVICE

CROSS-REFERENCE TO RELATED APPLICATIONS

This application is a continuation of International Application No. PCT/CN2019/099468, filed on Aug. 6, 2019, which claims priority to Chinese Patent Application No. 201810912312.8, filed on Aug. 11, 2018. The disclosures of the aforementioned applications are hereby incorporated by reference in their entireties.

TECHNICAL FIELD

This application relates to the field of communications technologies, and in particular, to a link failure recovery method and a related device.

BACKGROUND

With development of intelligent terminal devices, especially emergence of video services, it is difficult for current spectrum resources to meet an explosive increase in a user's requirement on a capacity. A high frequency band with a larger available bandwidth becomes a candidate frequency band for a next-generation communications system. In addition, in a modern communications system, a multi-antenna technology is usually used to improve a capacity and coverage of the system. Therefore, a size configured for a multi-antenna may be greatly reduced by using the high frequency band, to facilitate a step of obtaining more antennas at a site.

However, the high frequency band may be affected by factors such as atmosphere and vegetation, and therefore a loss of radio propagation is further increased. To overcome the loss of radio propagation, a signal transmission mechanism based on a beamforming technology is used, to compensate for the loss in a signal propagation process by using a relatively high antenna gain. Signals based on the beamforming technology may include a broadcast signal, a synchronization signal, a cell-specific reference signal, and the like.

However, when a signal is transmitted based on the beamforming technology, once a user moves, a beamforming direction corresponding to the transmitted signal may no longer match a user's location after the movement, and consequently receiving of the signal may be interrupted frequently. To resolve this problem, a corresponding link failure recovery method is provided. A base station configures an uplink resource set for each carrier, and each uplink resource in the uplink resource set is associated with one reference signal. After finding that a link failure occurs, a terminal device may send link failure recovery request information by using an uplink resource that is in the uplink resource set and that corresponds to a newly identified reference signal, so that the base station reestablishes a new link.

However, in the link failure recovery method, the base station needs to configure, for each carrier, an uplink resource set used to send link failure request information. Consequently, resource overheads are relatively high.

SUMMARY

This application provides a link failure recovery method and a related device, to reduce resource overheads required for link failure recovery.

According to one aspect, an embodiment of this application provides a link failure recovery method. In the method, a terminal device sends first indication information on a first uplink resource based on information about a spatial relation parameter, where the information about the spatial relation parameter is information about a spatial relation parameter used to send or receive a channel and/or a signal of a first cell; the first indication information indicates that a link failure occurs in a $i^{th}$ cell in N second cells; and the first uplink resource is an uplink resource of the first cell.

Herein, N is an integer greater than or equal to 1, and i is an integer greater than or equal to 1 and less than or equal to N.

It can be learned that in this implementation, the terminal device sends, on the uplink resource of the first cell by using the information about the spatial relation parameter used to send or receive the channel of the first cell, the first indication information indicating that the link failure occurs in a $i^{th}$ cell in the N second cells, to avoid a case in which a network device needs to configure a plurality of uplink resources that are associated with a plurality of reference signal resources of a second cell and that are used to indicate that a link failure occurs in the second cell. Therefore, resource overheads required for link failure recovery are reduced in this embodiment of this application.

In this implementation, when there is uplink and downlink reciprocity, the network device does not need to configure the plurality of uplink resources that are associated with a plurality of candidate downlink reference signals of the second cell and that are used to send link failure request information of the second cell, thereby reducing resource overheads. When there is no uplink and downlink reciprocity, in this implementation, the network device does not need to configure the plurality of uplink resources that are associated with a plurality of uplink reference signals of the second cell and that are used to send link failure request information of the second cell, thereby reducing resource overheads.

In other words, the link failure is an emergency. The network device is prevented from periodically allocating the uplink resources associated with the plurality of reference signal resources of each second cell, but sends, by using the uplink resources and the information about the spatial relation parameter used to send or receive the channel and/or the signal of the first cell, related information indicating that the link failure occurs in the second cell, thereby reducing resource overheads. In this embodiment of this application, the information about the spatial relation parameter includes quasi-collocation (QCL) assumption information, spatial relation information, and the like. The following describes an optional implementation of the information about the spatial relation parameter.

In an optional implementation, the information about the spatial relation parameter may be a general concept. To be specific, the terminal device does not configure specific information about the spatial relation parameter, but the terminal device may poll a plurality of transmit beams or transmit beams corresponding to a plurality of receive beams, to send the first indication information. Alternatively, the terminal device may send the first indication information by using a beamforming method. In other words, the terminal device sends the first indication information on the first uplink resource. Alternatively, the information about the spatial relation parameter may be QCL information or spatial relation information that is associated with a reference signal and that is specified by the network device. This is not limited in this embodiment of this application.

In an optional implementation, the information about the spatial relation parameter is quasi-colocation QCL assumption information used to receive a physical downlink control channel PDCCH of the first cell. In other words, the information about the spatial relation parameter is a transmit beam that corresponds to a receive beam and that is used by the terminal device to receive the PDCCH of the first cell.

In an example, the QCL assumption information is QCL assumption information of a control resource set with a smallest index value or identifier in control resource sets of the first cell. There are one or more PDCCHs of the first cell, and the one or more PDCCHs may be carried on one or more CORESETs. In this example, the QCL assumption information of the control resource set with the smallest index value or identifier in a plurality of CORESETs used for PDCCH detection is used as the information about the spatial relation parameter used to send the first indication information.

In another example, the QCL assumption information is QCL assumption information of a common search space CSS set of the first cell, or QCL assumption information of a control resource set in which a common search space CSS set of the first cell is located.

In another optional implementation, the information about the spatial relation parameter is spatial relation information used to send a physical uplink control channel PUCCH of the first cell. In other words, the information about the spatial relation parameter is a transmit beam used by the terminal device to send the PUCCH of the first cell. Optionally, the spatial relation information of the PUCCH is spatial relation information of a PUCCH with a smallest index value or identifier in PUCCHs of the first cell, or spatial relation information of a PUCCH used to send scheduling request information for a $i^{th}$ cell.

In still another optional implementation, the information about the spatial relation parameter is information about a spatial relation parameter on a synchronization signal broadcast channel block SSB resource of the first cell. In other words, the information about the spatial relation parameter is a transmit beam that corresponds to a receive beam and that is used by the terminal device to receive an SSB. Optionally, the SSB is an SSB received when the terminal device initially accesses the first cell.

In still another optional implementation, the information about the spatial relation parameter is spatial relation information of a channel used to carry link failure recovery request information of the first cell.

It can be learned that based on the information about the spatial relation parameter in the foregoing implementations, a probability that the network device receives the first indication information can be increased.

In addition to the foregoing optional implementations, when a link failure also occurs in the first cell, there may be different implementations for the information about the spatial relation parameter in different specific cases. For example, the following cases may be included: Case 1: Link failures may occur in both the first cell and a $i^{th}$ cell. Case 2: A link failure first occurs in the first cell, and then a link failure occurs in a $i^{th}$ cell. Case 3: A link failure first occurs in a $i^{th}$ cell, and a link failure also occurs in the first cell before response information returned by the network device is received. In this case, optional implementations include:

In an example, the terminal device may send the first indication information after sending the link failure recovery request information of the first cell. In this case, the terminal device may send the first indication information by using the spatial relation information of the channel used by the terminal device to carry the link failure recovery request information of the first cell. In other words, the information about the spatial relation parameter is the spatial relation information of the channel used to send the link failure recovery request information of the first cell. This example may be applied to Case 1 and Case 2 in the foregoing three cases.

In another example, the terminal device may send the first indication information after receiving link failure recovery response information of the first cell. In this case, the terminal device sends the first indication information by using the spatial relation information of the channel on which the terminal device can receive the link failure recovery response information of the first cell. In other words, the information about the spatial relation parameter is the spatial relation information of the channel used to carry the link failure response information of the first cell. Alternatively, the information about the spatial relation parameter is the spatial relation information of the channel used to carry the link failure recovery request information of the first cell, and the network device can receive the link failure recovery request information and return the link failure response information of the first cell. This example may be applied to Case 1 and Case 2 in the foregoing three cases. In this example, the terminal device may send the link failure recovery request information of the first cell for a plurality of times, but reliability of the spatial relation information on the channel on which the link failure recovery response information returned by the network device can be received may be better. Therefore, compared with the foregoing example, in this example, a probability that the network device receives the first indication information can be further increased.

In still another example, the terminal device may send the first indication information after receiving reconfiguration information of the first cell. The terminal device can successfully recover a link in the first cell by using the reconfiguration information sent by the network device. In this case, the terminal device may send the first indication information by using the reconfiguration information. Alternatively, after the link has been reestablished in the first cell, the terminal device may use the information about the spatial relation parameter in the foregoing implementations. For example, the information about the spatial relation parameter is active QCL assumption information or spatial relation information of the first cell, for example, QCL assumption information used to receive a PDCCH of the first cell, or spatial relation information used to send a PUCCH of the first cell, or information about a spatial relation parameter on an SSB resource of the first cell. This example may be applied to Case 1 and Case 2 in the foregoing three cases.

In still another example, after determining that a link failure occurs in a $i^{th}$ cell, the terminal device may send the first indication information in a manner described in the foregoing implementation of the information about the spatial relation parameter, without considering whether a link failure occurs in the first cell or without considering a link failure recovery process of the first cell. This example may be applied to any one of the foregoing three cases. In this example, the first indication information can be reported in a timelier manner.

For Case 3, after determining that a link failure occurs in a $i^{th}$ cell, the terminal device sends the first indication information in a manner described in the foregoing implementation of the information about the spatial relation parameter, but finds that a link failure also occurs in the first cell before receiving response information returned by the network device for a $i^{th}$ cell. In this case, the manners in the foregoing examples may be used for the information about the spatial relation parameter.

In this embodiment of this application, the first uplink resource is an uplink resource used to send the first indication information, and the first uplink resource is not limited to an uplink resource in a first uplink resource set.

The first uplink resource may also include a plurality of implementations. Details are described below.

In an optional implementation, the first uplink resource is a physical random access channel PRACH resource in the first uplink resource set, and the first uplink resource set is a set of configured resources used to send the link failure recovery request information of the first cell.

In another optional implementation, the first uplink resource is a PRACH resource that is in the first uplink resource set and that is associated with a first reference signal, the first reference signal is a reference signal associated with active QCL assumption information or spatial relation information of the first cell, and the first uplink resource set is a set of configured resources used to send the link failure recovery request information of the first cell. Because channel quality of the reference signal associated with the active QCL information or spatial relation information is relatively high, a probability of successfully sending the first indication information can be increased.

Further, a PRACH resource that is in the first uplink resource set and that is associated with a second reference signal is used to send the link failure recovery request information of the first cell, and the second reference signal is a reference signal associated with inactive QCL assumption information or spatial relation information of the first cell.

In other words, a protocol agreement or a signaling configuration may be completed in advance, and the first uplink resource used to send indication information indicating that link failures occur in the N second cells is the PRACH resource that is in the first uplink resource set and that is associated with the reference signal associated with the active QCL information or spatial relation information. In addition, a protocol agreement or a signaling configuration is completed in advance, and the uplink resource used to send indication information indicating that a link failure occurs in the first cell is a PRACH resource that is in the first uplink resource set and that is associated with the reference signal associated with the inactive QCL information or spatial relation information. In this way, when receiving the indication information that indicates that the link failure occurs and that is sent on the PRACH resource associated with the reference signal associated with the active QCL information or spatial relation information, the network device may determine that a link failure occurs in a cell in the second cells. When receiving the indication information that indicates that the link failure occurs and that is sent on the PRACH resource associated with the reference signal associated with the inactive QCL information or spatial relation information, the network device may determine that the link failure occurs in the first cell.

In still another optional implementation, when a link failure also occurs in the first cell, for example, in Cases 1 to 3 described above, the first uplink resource may be a PRACH resource that is in the first uplink resource set and that is used to send the link failure recovery request information of the first cell.

In still another optional implementation, the first uplink resource is a physical random access channel PRACH resource in the second uplink resource set, the second uplink resource set is a set of M PRACH resources that are configured for the N second cells on the uplink resource of the first cell and that are used to send link failure recovery request information. In other words, the network device may configure, on the uplink resource of the first cell, the M PRACH resources used to send the link failure recovery request information of the N second cells, and the M PRACH resources are referred to as the second uplink resource set. Herein, M is an integer greater than or equal to 1 and less than or equal to N.

In an example, when M=1, to be specific, the network device may configure, on the uplink resource of the first cell, one PRACH resource used to send the link failure recovery of the N second cells, when a link failure occurs in a cell in the N second cells, the PRACH resource may be used to send the link failure recovery request information, for example, the first indication information.

In another example, when N is equal to M, one PRACH resource in the second uplink resource set has a one-to-one mapping with one of the N second cells. The first uplink resource is a PRACH resource that is in the second uplink resource set and that corresponds to a $i^{th}$ cell.

In this example, after receiving the first indication information, the network device can learn, based on the first uplink resource, of a specific cell in which a link failure occurs. Therefore, the first indication information is further used to indicate identification information of a $i^{th}$ cell.

In still another example, when N is greater than M, one PRACH resource in the second uplink resource set corresponds to one of P second cell groups, the N second cells include the P second cell groups, and one second cell group includes one or more second cells, where P is an integer greater than or equal to 1 and less than N; and the first uplink resource is a PRACH resource that is in the second uplink resource set and that corresponds to a second cell group to which a $i^{th}$ cell belongs.

One of the P second cell groups has a one-to-one mapping with one PRACH resource in the second uplink resource set, and the first indication information is further used to indicate identification information of the second cell group to which a $i^{th}$ cell belongs. To be specific, after receiving the first indication information, the network device can learn, based on the first uplink resource, of a specific second cell group that is in the N second cells and to which a cell in which a link failure occurs belongs.

In still another optional implementation, the first uplink resource is a physical uplink control channel PUCCH resource that is configured on the uplink resource of the first cell and that is specially used to send link failure recovery request information of the N second cells.

In an example, the first indication information includes at least one of following: identification information of a $i^{th}$ cell, third reference signal information, and fourth reference signal information; and the third reference signal information is information about a reference signal whose channel quality is greater than or equal to a first threshold, and the fourth reference signal information is information about a reference signal whose channel quality is less than or equal to a second threshold. In this way, the terminal device sends the first indication information by using the dedicated PUCCH resource, so that the terminal device can notify, in a timelier manner, the network device of the foregoing related information of the cell in which the link failure occurs.

In this embodiment of this application, when the first uplink resource is the PRACH resource in the first uplink resource set or the PRACH resource in the second uplink resource set, after the network device receives the first indication information, if the terminal device further needs to report a candidate reference signal of a $i^{th}$ cell in which the link failure occurs, the link failure recovery method may further include the following steps: The terminal device receives first signaling, where the first signaling indicates a third uplink resource. The terminal device sends second indication information on the third uplink resource, where the second indication information indicates at least one of following: identification information of a $i^{th}$ cell, third reference signal information, and fourth reference signal information, the third reference signal information is information about a reference signal whose channel quality is greater than or equal to a first threshold, and the fourth reference signal information is information about a reference signal whose channel quality is less than or equal to a second threshold.

In this embodiment of this application, after receiving the first indication information, the network device can identify, based on the first uplink resource used for the first indication information, that the cell in which the link failure occurs is a cell in the N second cells, a second cell group in which the cell in which the link failure occurs is located, or the cell in which the link failure occurs. The network device may further trigger, by using the first signaling, candidate reference signal resource sets of the N second cells, a candidate reference signal resource set of a second cell group in which a $i^{th}$ cell is located, or a candidate reference signal resource set of a $i^{th}$ cell. This avoids a prior-art problem that resource overheads are caused because the network device periodically triggers a candidate reference signal resource set of each cell to send each reference signal. That the first signaling is used to trigger the candidate reference signal resource set may be understood as that the first signaling indicates sending of the candidate reference signal resource set.

In this embodiment of this application, the third uplink resource is a physical uplink shared channel PUSCH resource or a PRACH resource.

The PUSCH resource is a resource specially used to send indication information indicating that link failures occur in the N second cells. For example, the PUSCH resource is specially used to send the second indication information.

When the third uplink resource is the PRACH resource, the PRACH resource is a PRACH resource in the first uplink resource set of the first cell. In this case, each PRACH resource in the first uplink resource set not only needs to be associated with a downlink reference signal in a candidate reference signal resource set of the first cell, but also needs to be associated with a downlink reference signal in a candidate reference signal resource set of each cell in the N second cells. Therefore, when the terminal device reports the second indication information by using the third uplink resource, the network device can learn, based on the first indication information and the downlink reference signal associated with the third uplink resource, of a candidate downlink reference signal determined by the terminal device for the cell in which the link failure occurs. An implementation in which the network device can be notified of identification information of the cell in which the link failure occurs in the foregoing implementations needs to be used for the first indication information. It can be learned that compared with a prior-art implementation of configuring a plurality of uplink resources that are associated with a plurality of reference signal resources of a second cell and that are used to indicate that a link failure occurs in the second cell, this implementation can still reduce resource overheads.

For example, in the foregoing implementation, when N=M, one PRACH resource corresponds to one second cell. The network device can learn of identification information of the second cell based on the PRACH resource that is in the second uplink resource set and that is used for the first indication information, and further learn, by using the third uplink resource as one PRACH resource in the first uplink resource set, of a candidate downlink reference signal determined by the terminal device for the second cell. Assuming that the candidate reference signal resource set of the second cell includes X downlink reference signals, in the prior art, the network device needs to configure X PRACH resources for the second cell. In this implementation, the foregoing information can be reported by configuring one PRACH resource for one second cell. Therefore, this implementation can still reduce resource overheads.

In this embodiment of this application, the first signaling is MAC CE signaling or DCI signaling.

In an example, the MAC CE signaling or the DCI signaling is signaling specially used to indicate the third uplink resource.

The DCI may be scrambled by using a dedicated radio network temporary identifier, or the DCI carries a dedicated indication, to notify the terminal device that the PUSCH resource scheduled by the DCI is a resource used to send the link failure recovery request information.

Optionally, PRACH resources in the first uplink resource set and the second uplink resource set that are configured by the network device for the terminal device may also be replaced with PUCCH resources. In other words, the first uplink resource set is a set of PUCCH resources used to send the link failure recovery request information of the first cell, and the second uplink resource set is a set of PUCCH resources used to send the link failure recovery request information of the N second cells. This implementation may be combined with any one of the implementations corresponding to the first uplink resource. For example, that the first uplink resource is the PRACH resource in the first uplink resource set may be correspondingly replaced with that the first uplink resource is a PUCCH resource in the first uplink resource set. In addition, a difference between the PUCCH resource in this implementation and the PUCCH resource specially used to send the link failure recovery request information of the N second cells lies in that the PUCCH resource in this implementation may not carry candidate reference signal information, for example, the third reference signal information and/or the fourth reference signal information. Therefore, this implementation further needs to be combined with related content of the foregoing first signaling, namely, reference signal information such as the third reference signal information and/or the fourth reference signal information that is reported by using the third uplink resource indicated by the first signaling.

In some of the foregoing implementations, when the first indication information or the second indication information indicates the identification information of a $i^{th}$ cell, and is further used to indicate the third reference signal information and/or the fourth reference signal information, the identification information of a $i^{th}$ cell and the third reference signal information and/or the fourth reference signal information are independently encoded.

The independent encoding indicates that the identification information and the third reference signal information and/ or the fourth reference signal information are the first indication information or the second indication information separately obtained by performing encoding. Only when identifying the identification information, the network device can learn of a quantity of bits of the third reference signal information and/or a quantity of bits of the fourth reference signal information, that is, can identify the third reference signal information and/or the fourth reference signal information. For example, the identification information is represented by Q1 bits, and the third reference signal information and/or the fourth reference signal information are/is represented by Q2 bits. The terminal device encodes the Q1 bits to obtain first information, and encodes the Q2 bits to obtain second information. In this case, the first indication information or the second indication information includes the first information and the second information. The network device decodes the Q1 bits that are in the first indication information or the second indication information and that are used to carry the identification information, to obtain the identification information. The network device decodes, based on the identification information, the Q2 bits that are in the first indication information or the second indication information and that are used to carry the third reference signal information and/or the fourth reference signal information, to obtain the third signal reference information and/or the fourth reference signal information.

In this embodiment of this application, a payload of the first indication information and/or a payload of the second indication information are/is related to the first uplink resource. Descriptions are provided below in different implementations.

In an implementation, the first uplink resource used to send the first indication information is a PUCCH resource that is configured by the network device for the N second cells and that is specially used to send the link failure recovery request information.

In this case, the first indication information needs to indicate identification information of a $i^{th}$ cell, and third reference signal information and/or fourth reference signal information. Because both the terminal device and the network device know a quantity of second cells, a quantity of bits of the identification information of a $i^{th}$ cell is a fixed value, for example, $[\log_2 N]$. A quantity of bits of the third reference signal information and/or a quantity of bits of the fourth reference signal information is related to a quantity of downlink reference signals in a candidate reference signal resource set of each cell identified by the identification information.

Therefore, when the payload of the first indication information is a fixed value, the quantity of bits of the third reference signal information is determined based on a candidate reference signal resource set with a largest quantity of downlink reference signals that is in a plurality of candidate reference signal resource sets corresponding to the N second cells, and the quantity of bits of the fourth reference signal information is determined based on a beam failure detection reference signal resource set with a largest quantity of downlink reference signals that is in a plurality of beam failure detection reference signal resource sets corresponding to the N second cells. It is assumed that the candidate reference signal resource set with the largest quantity of downlink reference signals includes Y downlink reference signals. Optionally, the payload of the first indication information may be determined based on $[\log_2 N]+[\log_2 Y]$.

When the payload of the first indication information is a non-fixed value, the quantity of bits of the third reference signal information changes with a quantity of downlink reference signals in a candidate reference signal resource set of a cell indicated by the identification information. The quantity of bits of the fourth reference signal information changes with a quantity of downlink reference signals in a beam failure detection reference signal resource set of a cell indicated by the identification information.

In another optional implementation, when the first uplink resource is a PRACH resource in the first uplink resource set, or when the first uplink resource is a PRACH resource that is in the first uplink resource set and that is associated with a downlink reference signal associated with active QCL assumption information or spatial relation information, the first indication information cannot be used to notify the network device of identification information of the cell in which the link failure occurs.

Therefore, a quantity of bits of the identification information in the second indication information is related to a total quantity of cells connected to the terminal device. If the payload of the second indication information is a fixed value, a quantity of bits of the third reference signal information in the second indication information is related to a candidate reference signal resource set with a largest quantity of downlink reference signals that is in candidate reference signal resource sets of all cells of the terminal device, and a quantity of bits of the fourth reference signal information is related to a beam failure detection reference signal resource set with a largest quantity of downlink reference signals that is in beam failure detection reference signal resource sets of all cells of the terminal device. If the payload of the second indication information is a non-fixed value, a quantity of bits of the third reference signal information in the second indication information changes with a quantity of downlink reference signals in a candidate reference signal resource set of a cell indicated by the identification information, and a quantity of bits of the fourth reference signal information changes with a quantity of downlink reference signals in a beam failure detection reference signal resource set of a cell indicated by the identification information.

In this implementation, the total quantity of cells may be a quantity of cells in which the terminal device needs to perform link failure recovery. Alternatively, when a plurality of cells that share same information about a spatial relation parameter are referred to as a cell group, the total quantity of cells may be a quantity of cell groups corresponding to different information about spatial relation parameters. Alternatively, the total quantity of cells may be a quantity of cells that have no uplink resource, or may be a quantity of high-frequency cells.

In still another optional implementation, when the first uplink resource is a PRACH resource that is in the first uplink resource set and that is associated with a downlink reference signal associated with active QCL or spatial relation information, and the uplink resource used to send the link failure recovery request information of the first cell is a PRACH resource that is in the first uplink resource set and that is associated with a reference signal associated with inactive QCL information or spatial relation information; or when the first uplink resource is a PRACH resource in the second uplink resource set, because the first indication information can indicate that a link failure occurs in a cell in the N second cells, a quantity of bits of the identification information in the second indication information is related to N, for example, is $[\log_2 N]$.

Correspondingly, if the payload of the second indication information is a fixed value, a quantity of bits of the third reference signal information in the second indication information is related to a candidate reference signal resource set with a largest quantity of downlink reference signals that is in candidate reference signal resource sets of all cells in the N second cells, and a quantity of bits of the fourth reference signal information is related to a beam failure detection reference signal resource set with a largest quantity of downlink reference signals that is in beam failure detection reference signal resource sets of all cells in the N second cells. If the payload of the second indication information is a non-fixed value, a quantity of bits of the third reference signal information in the second indication information changes with a quantity of downlink reference signals in a candidate reference signal resource set of a second cell indicated by the identification information, and a quantity of bits of the fourth reference signal information changes with a quantity of downlink reference signals in a beam failure detection reference signal resource set of a second cell indicated by the identification information.

In still another optional implementation, when N is equal to M, to be specific, the first uplink resource is a PRACH resource that is in the second uplink resource set and that corresponds to a $i^{th}$ cell, the first indication information is further used to indicate identification information of a $i^{th}$ cell, and the second indication information does not need to include the identification information of a $i^{th}$ cell, but needs to include only third reference signal information and/or fourth reference signal information. The first indication information is further used to indicate the identification information of a $i^{th}$ cell. In other words, in this implementation, due to an association relationship between a PRACH resource in the second uplink resource set and each second cell, the network device can determine the identification information of the cell based on the PRACH resource on which the first indication information is received, but the first indication information does not include the identification information of the cell.

Therefore, if the payload of the second indication information is a fixed value, a quantity of bits of the third reference signal information is related to a candidate reference signal resource set with a largest quantity of downlink reference signals that is in candidate reference signal resource sets of all cells in the N second cells, and a quantity of bits of the fourth reference signal information is related to a beam failure detection reference signal resource set with a largest quantity of downlink reference signals that is in beam failure detection reference signal resource sets of all cells in the N second cells. If the payload of the second indication information is a non-fixed value, a quantity of bits of the third reference signal information is related to a quantity of downlink reference signals in a candidate reference signal resource set of a $i^{th}$ cell, and a quantity of bits of the fourth reference signal information is related to a quantity of downlink reference signals in a beam failure detection reference signal resource set of a $i^{th}$ cell.

In still another optional implementation, when the first uplink resource is a PRACH resource that is in the second uplink resource set and that corresponds to a second cell group to which a $i^{th}$ cell belongs, the first indication information is further used to indicate identification information of the second cell group to which a $i^{th}$ cell belongs, and the identification information in the second indication information may be intra-group identification information of a $i^{th}$ cell in the second cell group. When the payload of the second indication information is a fixed value, a quantity of bits of the identification information is determined based on a second cell group that is in the P second cell groups and that includes a largest quantity of second cells, a quantity of bits of the third reference signal information is related to a candidate reference signal resource set with a largest quantity of downlink reference signals that is in a plurality of candidate reference signal resource sets corresponding to the second cell group to which a $i^{th}$ cell belongs, and a quantity of bits of the fourth reference signal information is related to a beam failure detection reference signal resource set with a largest quantity of downlink reference signals that is in a plurality of beam failure detection reference signal resource sets corresponding to the second cell group to which a $i^{th}$ cell belongs. When the payload of the second indication information is a non-fixed value, a quantity of bits of the identification information is determined based on a quantity of second cells included in a second cell group to which a $i^{th}$ cell belongs, a quantity of bits of the third reference signal information is related to a quantity of downlink reference signals in a candidate reference signal resource set of a $i^{th}$ cell, that is, is related to a quantity of downlink reference signals in a candidate reference signal resource set of a cell indicated by the identification information, and a quantity of bits of the fourth reference signal information is related to a quantity of downlink reference signals in a beam failure detection reference signal resource set of a $i^{th}$ cell, that is, is related to a quantity of downlink reference signals in a beam failure detection reference signal resource set of a cell indicated by the identification information.

In this embodiment of this application, the first cell is a cell in which a resource used to send the scheduling request information for a $i^{th}$ cell is located.

According to another aspect, an embodiment of this application further provides a link failure recovery method. The link failure recovery method is described from a perspective of a network device side. For specific descriptions of content that is the same as that of the link failure recovery method in the foregoing aspect, refer to the foregoing content. Details are not described herein again.

The link failure recovery method in this aspect includes: A network device receives first indication information on a first uplink resource based on information about a spatial relation parameter. The network device sends link failure response information based on the first indication information. The information about the spatial relation parameter is information about a spatial relation parameter used to send or receive a channel and/or a signal of a first cell; the first indication information indicates that a link failure occurs in a $i^{th}$ cell in N second cells, where N is an integer greater than or equal to 1, and i is an integer greater than or equal to 1 and less than or equal to N; and the first uplink resource is an uplink resource of the first cell.

That the network device sends link failure response information based on the first indication information may include: The network device determines, based on the first indication information and/or the first uplink resource, identification information of a cell in which a link failure occurs, and candidate downlink reference signal information of the cell. The network device sends, by using spatial relation information associated with the downlink reference signal information, the link failure response information on a downlink resource of the cell identified by the identification information.

In an optional implementation, the information about the spatial relation parameter is quasi-colocation QCL assumption information used to receive a physical downlink control channel PDCCH of the first cell.

In an optional implementation, the information about the spatial relation parameter is spatial relation information used to send a physical uplink control channel PUCCH of the first cell.

In an optional implementation, the information about the spatial relation parameter is for a synchronization signal broadcast channel block SSB resource of the first cell.

In an optional implementation, the information about the spatial relation parameter is spatial relation information of a channel used to carry link failure recovery request information of the first cell.

In an optional implementation, the QCL assumption information is QCL assumption information of a control resource set with a smallest index value or identifier in control resource sets of the first cell, or QCL assumption information of a common search space CSS set of the first cell, or QCL assumption information of a control resource set in which a common search space CSS set of the first cell is located.

In an optional implementation, the spatial relation information is spatial relation information of a PUCCH with a smallest index value or identifier in PUCCHs of the first cell, or spatial relation information of a PUCCH used to send scheduling request information for a $i^{th}$ cell.

In an optional implementation, the method further includes: The network device sends first signaling, where the first signaling indicates a third uplink resource. The network device receives second indication information on the third uplink resource, where the second indication information indicates at least one of following: identification information of a $i^{th}$ cell, third reference signal information, and fourth reference signal information, the third reference signal information is information about a reference signal whose channel quality is greater than or equal to a first threshold, and the fourth reference signal information is information about a reference signal whose channel quality is less than or equal to a second threshold. That the network device sends link failure response information based on the first indication information includes: The network device sends the link failure response information based on the first indication information and the second indication information.

In an optional implementation, the first uplink resource is a physical random access channel PRACH resource in a first uplink resource set, and the first uplink resource set is a set of configured resources used to send the link failure recovery request information of the first cell.

In an optional implementation, the first uplink resource is a PRACH resource that is in a first uplink resource set and that is associated with a first reference signal, the first reference signal is a reference signal associated with active QCL assumption information or spatial relation information of the first cell, and the first uplink resource set is a set of configured resources used to send the link failure recovery request information of the first cell.

In an optional implementation, a PRACH resource that is in the first uplink resource set and that is associated with a second reference signal is used to send the link failure recovery request information of the first cell, and the second reference signal is a reference signal associated with inactive QCL assumption information or spatial relation information of the first cell.

In an optional implementation, the first uplink resource is a physical random access channel PRACH resource in a second uplink resource set, and the second uplink resource set is a set of M PRACH resources that are configured for the N second cells on the uplink resource of the first cell and that are used to send link failure recovery request information, where M is an integer greater than or equal to 1 and less than or equal to N.

In an optional implementation, when N is equal to M, one PRACH resource in the second uplink resource set has a one-to-one mapping with one of the N second cells.

The first uplink resource is a PRACH resource that is in the second uplink resource set and that corresponds to a $i^{th}$ cell.

In an optional implementation, the first indication information is further used to indicate the identification information of a $i^{th}$ cell.

In an optional implementation, when N is greater than M, one PRACH resource in the second uplink resource set corresponds to one of P second cell groups, the N second cells include the P second cell groups, and one second cell group includes one or more second cells, where P is a positive integer greater than or equal to 1 and less than N; and the first uplink resource is a PRACH resource that is in the second uplink resource set and that corresponds to a second cell group to which a $i^{th}$ cell belongs.

In an optional implementation, the first indication information is further used to indicate identification information of the second cell group to which a $i^{th}$ cell belongs.

In an optional implementation, the first uplink resource is a physical uplink control channel PUCCH resource that is configured on the uplink resource of the first cell and that is specially used to send link failure recovery request information of the N second cells.

In an optional implementation, the first indication information includes at least one of following: identification information of a $i^{th}$ cell, third reference signal information, and fourth reference signal information.

The third reference signal information is information about a reference signal whose channel quality is greater than or equal to a first threshold, and the fourth reference signal information is information about a reference signal whose channel quality is less than or equal to a second threshold.

In an optional implementation, the first signaling is further used to trigger candidate reference signal resource sets of the N second cells, a candidate reference signal resource set of a $i^{th}$ cell, or a candidate reference signal resource set of a second cell group in which a $i^{th}$ cell is located.

In an optional implementation, the third uplink resource is a physical uplink shared channel PUSCH resource or a PRACH resource.

In an optional implementation, when the first indication information or the second indication information indicates the identification information of a $i^{th}$ cell, and is further used to indicate the third reference signal information and/or the fourth reference signal information, the identification information of a $i^{th}$ cell and the third reference signal information and/or the fourth reference signal information are independently encoded.

In an optional implementation, a payload of the second indication information is related to the first uplink resource.

In an optional implementation, a payload of the first indication information and/or a payload of the second indication information are/is fixed values/a fixed value. The payload of the first indication information and/or the payload of the second indication information are/is related to a candidate reference signal resource set with a largest quantity of downlink reference signals that is in a plurality of candidate reference signal resource sets corresponding to the N second cells.

In an optional implementation, the first cell is a cell in which a resource used to send the scheduling request information for a $i^{th}$ cell is located.

According to still another aspect, this application further provides a link failure recovery method. In the link failure recovery method, a terminal device sends first indication information on a first uplink resource, where the first indication information indicates that in N second cells, there is a cell in which a link failure occurs, and the first uplink resource is an uplink resource of a first cell. The terminal device receives first signaling, where the first signaling indicates a third uplink resource. The terminal device sends second indication information on the third uplink resource, where the second indication information indicates at least one of following: identification information of a $i^{th}$ cell in which a link failure occurs in the N second cells, third reference signal information, and fourth reference signal information. It can be learned that in this application, a network device may be notified based on the uplink resource of the first cell that there is the cell in which the link failure occurs in the N second cells, so that the network device can indicate the third uplink resource, and the terminal device can send, on the third uplink resource, identification information of the cell in which the link failure occurs, reference signal information, or the like.

Herein, N is an integer greater than or equal to 1. The third reference signal information is information about a reference signal whose channel quality is greater than or equal to a first threshold, and the fourth reference signal information is information about a reference signal whose channel quality is less than or equal to a second threshold.

In an implementation, that a terminal device sends first indication information on a first uplink resource includes: The terminal device sends the first indication information on the first uplink resource based on information about a spatial relation parameter, where the information about the spatial relation parameter is information about a spatial relation parameter used to send or receive a channel or a signal of the first cell.

In this aspect, for content such as the first uplink resource, the information about the spatial relation parameter, the first indication information, the third uplink resource, and the second indication information, refer to the related content in the first aspect. Details are not described herein again.

According to still another aspect, this application further provides a link failure recovery method. In the link failure recovery method, a network device receives first indication information on a first uplink resource, where the first indication information indicates that in N second cells, there is a cell in which a link failure occurs, where N is an integer greater than or equal to 1; and the first uplink resource is an uplink resource of a first cell. The network device sends first signaling, where the first signaling indicates a third uplink resource. The network device receives second indication information on the third uplink resource, where the second indication information indicates at least one of following: identification information of a $i^{th}$ cell, third reference signal information, and fourth reference signal information, the third reference signal information is information about a reference signal whose channel quality is greater than or equal to a first threshold, and the fourth reference signal information is information about a reference signal whose channel quality is less than or equal to a second threshold. The network device sends link failure response information based on the first indication information and the second indication information.

It can be learned that in this application, the network device may learn, based on the uplink resource of the first cell, that there is the cell in which the link failure occurs in the N second cells, so that the network device can indicate the third uplink resource, and a terminal device can send, on the third uplink resource, identification information of the cell in which the link failure occurs, reference signal information, or the like.

In an implementation, that a network device receives first indication information on a first uplink resource includes: The network device sends the first indication information on the first uplink resource based on information about a spatial relation parameter, where the information about the spatial relation parameter is information about a spatial relation parameter used to send or receive a channel or a signal of the first cell.

In this aspect, for content such as the first uplink resource, the information about the spatial relation parameter, the first indication information, the third uplink resource, and the second indication information, refer to the related content in the first aspect. Details are not described herein again.

According to still another aspect, this application further provides a terminal device. The terminal device has some or all functions of implementing actions of the terminal device in the foregoing method examples. For example, the terminal device may have functions in some or all embodiments of this application, or may have a function of independently implementing any embodiment of this application. The function may be implemented by hardware, or may be implemented by hardware executing corresponding software. The hardware or the software includes one or more units or modules corresponding to the foregoing function.

In a possible design, a structure of the terminal device may include a sending unit and a receiving unit. The sending unit and the receiving unit are configured to support communication between the terminal device and another device. The terminal device may further include a storage unit. The storage unit is configured to be coupled to a configuration unit and the sending unit, and the storage unit stores a program instruction and data that are necessary for the terminal device. For example, the terminal device may further include a processor, a transceiver, a memory, and the like, to perform the functions of the sending unit, the receiving unit, and the storage unit.

According to still another aspect, this application further provides a network device. The network device has some or all functions of implementing actions of the network device in the foregoing method examples. For example, the network device may have functions in some or all embodiments of this application, or may have a function of independently implementing any embodiment of this application. The function may be implemented by hardware, or may be implemented by hardware executing corresponding software. The hardware or the software includes one or more units or modules corresponding to the foregoing function.

In a possible design, a structure of the network device may include a receiving unit and a sending unit. The receiving unit and the sending unit are configured to support communication between the network device and another device. The network device may further include a storage unit. The storage unit is configured to be coupled to the receiving unit and the sending unit, and the storage unit stores a program instruction and data that are necessary for the network devices. For example, the receiving unit, the sending unit, and the storage unit may be a processor, a transceiver, a memory, and the like.

According to still another aspect, an embodiment of the present disclosure provides a communications system. The system includes at least one network device and at least one terminal device in the foregoing aspects. In another possible design, the system may further include another device that interacts with the terminal device or the network device in the solutions provided in the embodiments of the present disclosure.

According to still another aspect, an embodiment of the present disclosure provides a computer storage medium, configured to store a computer software instruction used by the foregoing network device. The computer storage medium includes a program designed for performing the method in any one of the foregoing aspects.

According to still another aspect, an embodiment of the present disclosure provides a computer storage medium, configured to store a computer software instruction used by the foregoing terminal device. The computer storage medium includes a program designed for performing any aspect of the foregoing method.

According to still another aspect, this application further provides a computer program product including an instruction. When the computer program product is run on a computer, the computer is enabled to perform the methods in the foregoing aspects.

According to still another aspect, this application provides a chip system. The chip system includes a processor, configured to support a network device in implementing the functions in the foregoing aspects, for example, determining or processing the data and/or the information in the foregoing methods. In a possible design, the chip system further includes a memory. The memory is configured to store a program instruction and data that are necessary for the network device. The chip system may include a chip, or may include a chip and another discrete component.

According to still another aspect, this application provides a chip system. The chip system includes a processor, configured to support a terminal device in implementing the functions in the foregoing aspects, for example, generating or processing the data and/or the information in the foregoing methods. In a possible design, the chip system further includes a memory. The memory is configured to store a program instruction and data that are necessary for the terminal device. The chip system may include a chip, or may include a chip and another discrete component.

DESCRIPTION OF EMBODIMENTS

Figure 1:
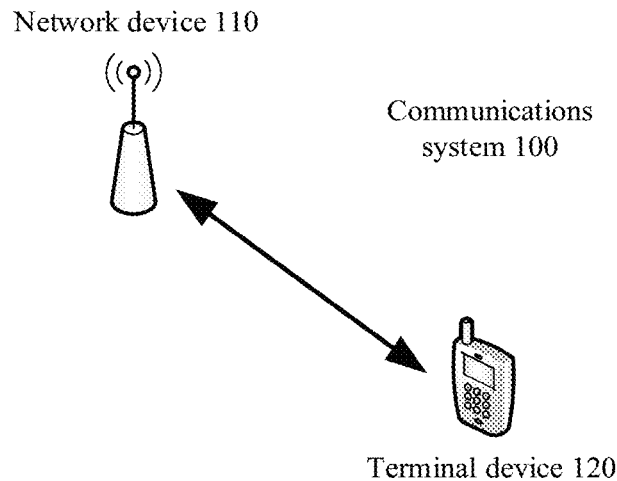
FIG. 1 is a schematic structural diagram of a communications system according to an embodiment of this application.

The following describes the embodiments of this application with reference to the accompanying drawings in the embodiments of this application.

In the specification, claims, and the accompanying drawings of this application, the terms "first", "second", "third", "fourth" and the like are intended to distinguish between different objects but do not indicate a particular sequence. In addition, the terms "include", "have", and any other variant thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

An "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

The technical solutions in this application may be specifically applied to various communications systems, for example, a global system for mobile communications (GSM), a code division multiple access (CDMA) system, a wideband code division multiple access (WCDMA) system, a time division-synchronous code division multiple access (TD-SCDMA) system, a universal mobile telecommunications system (UMTS), and a long term evolution (LTE) system. With continuous development of communications technologies, the technical solutions in this application may be further applied to a future network, for example, a 5G system, or referred to as a new radio (NR) system, or the technical solutions may be applied to a device-to-device (D2D) system, a machine-to-machine (M2M) system, or the like.

A network device in this application may be an entity configured to send or receive information on a network side, for example, may be a base station, a transmission point (TP), a transmission reception point (TRP), a relay device, or another network device that has a base station function. This is not limited in this application. A communications device in this application may be a centralized control module or another network device. The communications device can configure, for a terminal device, a scrambling identifier associated with downlink control information configuration information or a downlink control parameter; or configure a plurality of scrambling identifiers associated with different downlink control information configuration information or downlink control parameters. In this application, the communications device and the network device may be a same device or different devices.

In this application, the terminal device is a device having a communication function, and may include a handheld device having a wireless communication function, a vehicle-mounted device, a wearable device, a computing device, another processing device connected to a wireless modem, or the like. The terminal device may have different names in different networks, for example, a terminal device, a user equipment (UE), a mobile station, a subscriber unit, a relay, a station, a cellular phone, a personal digital assistant, a wireless modem, a wireless communications device, a handheld device, a laptop computer, a cordless phone, and a wireless local loop station. The terminal device may be a wireless terminal device or a wired terminal device. The wireless terminal device may be a device that provides a user with voice and/or data connectivity, a handheld device having a wireless connection function, or another processing device connected to a wireless modem. The wireless terminal device may communicate with one or more core networks through a radio access network (RAN).

A to-be-resolved technical problem and an application scenario in this application are first described.

Currently, to implement link failure recovery, the network device needs to configure one uplink resource set for each cell. The uplink resource set includes a plurality of physical random access channel (PRACH) resources, reference signals in a candidate reference signal resource set of the cell are in a one-to-one correspondence with PRACH resources in the uplink resource set, and the PRACH resources are used to send link failure recovery request information of the cell.

For example, a process in which the terminal device performs link failure recovery on a cell by using an uplink resource set of the cell may include the following steps: The terminal device determines that a link failure occurs. The terminal device detects channel quality of a reference signal in a candidate reference signal resource set, to determine a downlink reference signal whose channel quality is greater than a preset threshold. The terminal device sends link failure recovery request information by using a PRACH resource that is in the uplink resource set and that is associated with the downlink reference signal. The network device sends link failure response information based on the link failure recovery request information. The terminal device detects a control resource set to obtain the link failure response information.

The terminal device sends the link failure recovery request information by using the PRACH resource that is determined in the uplink resource set and that is associated with the downlink reference signal. It can be learned that in a current link failure recovery method, for each cell, the network device needs to configure one uplink resource for each downlink reference signal in a candidate reference signal resource set of the cell. Assuming that the candidate reference signal resource set of the cell includes 16 downlink reference signals, 16 uplink resources need to be configured for the cell, and the 16 uplink resources can only be used to send the link failure recovery request information. Each carrier corresponds to one cell, and each cell corresponds to one candidate reference signal resource set. Therefore, more uplink resources that are associated with a plurality of reference signal resources of each cell and that are used to indicate that a link failure occurs in the cell need to be configured, thereby resulting in huge resource overheads.

To resolve the foregoing problem, embodiments of this application provide a link failure recovery method and a related device. In the link failure recovery method, a terminal device may send first indication information on a first uplink resource based on information about a spatial relation parameter, to indicate that a link failure occurs in a $i^{th}$ cell in N second cells. Correspondingly, a network device may receive the first indication information on the first uplink resource based on the information about the spatial relation parameter, and send link failure recovery response information based on the first indication information, to recover a failed link. The information about the spatial relation parameter is information about a spatial relation parameter used to send a channel and/or a signal of a first cell, and the first uplink resource is an uplink resource of the first cell. In this way, the network device does not need to configure a plurality of uplink resources that are associated with a plurality of reference signal resources of a second cell and that are used to indicate that a link failure occurs in the second cell, thereby reducing resource overheads.

FIG. 1 is a schematic structural diagram of a communications system 100 according to an embodiment of this application. The communications system 100 is in a carrier aggregation (CA) scenario or a dual connectivity (DC) scenario. The communications system 100 includes a network device 110 and a terminal device 120. The network device 110 communicates with the terminal device 120 through a wireless network. After the terminal device 120 detects that a link between the network device 110 and the terminal device 120 is faulty, the terminal device 120 sends a link failure recovery request (or beam failure recovery request (BFRQ)) to the network device 110. After receiving the BFRQ, the network device 110 sends a link failure recovery response (or beam failure recovery response (BFRR)) to the terminal device 120.

It should be understood that the network device 110 in FIG. 1 may include a plurality of cells, for example, a first cell and a second cell. If a link between the terminal device and the network device in the second cell is faulty, the first cell may assist the second cell in performing link recovery. For example, the terminal device may send information about the BFRQ to the network device on an uplink resource that belongs to the first cell, and the terminal device may receive, on a downlink resource that belongs to the second cell, information about the BFRR sent by the network device.

When transmission of the communications system 100 is uplink transmission, the terminal device 120 is a transmit end, and the network device 110 is a receive end. When transmission of the communications system 100 is downlink transmission, the network device 110 is a transmit end, and the terminal device 120 is a receive end.

Figure 2:
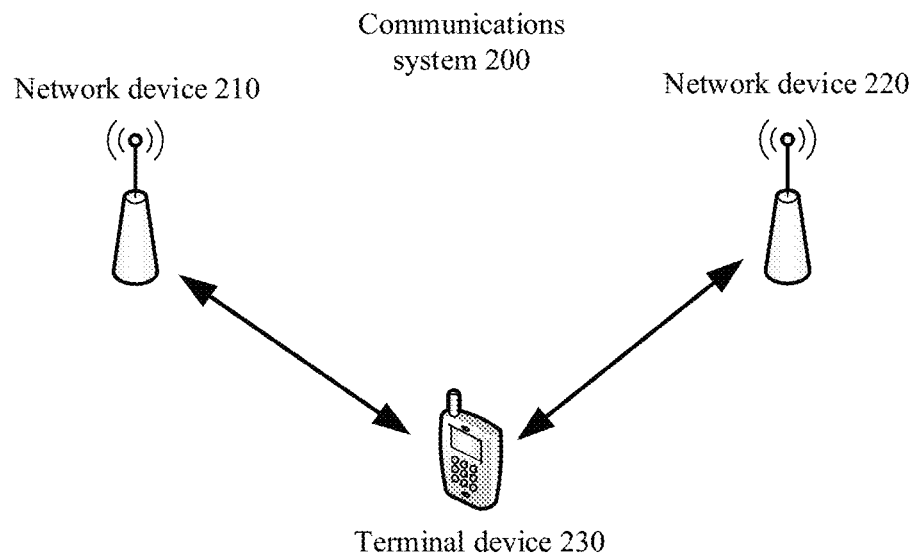
FIG. 2 is a schematic structural diagram of a communications system according to an embodiment of this application.

FIG. 2 is a schematic structural diagram of another communications system 200 according to an embodiment of this application. The communications system 200 is in a dual connectivity (DC), carrier aggregation (CA), or coordinated multipoint transmission/reception (CoMP) scenario. The communications system 200 includes a network device 210, a network device 220, and a terminal device 230. The network device 210 is a network device responsible for RRC communication with the terminal device 230 during initial access of the terminal device 230. The network device 220 is added during RRC reconfiguration, and is configured to provide an additional radio resource. The terminal device 230 for which carrier aggregation (CA) is configured is connected to the network device 210 and the network device 220. A link between the network device 210 and the terminal device 230 may be referred to as a first link, and a link between the network device 220 and the terminal device 230 may be referred to as a second link.

When both the network device 210 and the network device 220 may configure, for the terminal device 230, uplink resources used to transmit a BFRQ, when the first link or the second link is faulty, the terminal device 230 may send the BFRQ to the network device 210 or the network device 220 on the uplink resource used to transmit the BFRQ. After receiving the BFRQ, the network device 210 or the network device 220 sends a BFRR to the terminal device 230.

When the network device 220 does not configure an uplink resource used to transmit a BFRQ, when the second link is faulty, the terminal device 230 may recover the second link by using the network device 210.

Optionally, the network device 210 in the communications system 200 may be a primary network device of the terminal device, and the network device 220 may be one of a plurality of secondary network devices of the terminal device.

In an embodiment, the network device 210 may be a primary base station, and the network device 220 may be a secondary base station. Alternatively, the network device 210 may be a secondary base station, and the network device 220 may be a primary base station.

In this embodiment of this application, the network device 210 may be a base station of a primary cell/primary serving cell (PCell), a base station of a primary secondary cell (PSCell), a base station of a special cell (SpCell), a transmission reception point (TRP), or a base station of a secondary cell/secondary serving cell (SCell), and the second network device may be a base station of an SCell or a TRP. Alternatively, the network device 210 may be a TRP or a base station of an SCell, and the network device 220 may be a TRP or a base station of a PCell, a PSCell, an SpCell, or an SCell.

In this embodiment of this application, a first cell may be a PCell, a PSCell, an SpCell, or an SCell, and a second cell may be an SCell. Alternatively, a first cell may be an SCell, and a second cell may be a PCell, a PSCell, an SpCell, or an SCell.

The PCell, the PSCell, the SCell, and the SpCell are described as follows:

PCell: The PCell is a primary cell on which the terminal device camps in a CA scenario. PSCell: The PSCell is a special primary secondary cell that is on a secondary network device and that is configured by a primary network device for the terminal device by using RRC connection signaling.

SCell: The SCell is a cell that is configured for the terminal device by using RRC connection signaling and that works on a secondary component carrier (SCC), and can provide more radio resources for the terminal device. In the SCell, there may be only downlink transmission or both uplink and downlink transmission.

SpCell: In a DC scenario, the SpCell is a PCell in a master cell group (MCG) or a PSCell in a secondary cell group (SCG). Alternatively, in a CA scenario, the SpCell is a PCell.

It should be understood that the technical solutions in the embodiments of this application may be applied to a case in which a primary cell (PCell) is at a high frequency or a low frequency, and a secondary cell (SCell) is at a high frequency or a low frequency. For example, when the PCell is at a low frequency and the SCell is at a high frequency, because no uplink resource is configured for the SCell, no PRACH or PUCCH resource used for link failure detection is configured for the PCell at a low frequency. Usually, a low frequency and a high frequency are relative to each other, or may be differentiated based on a specific frequency, for example, 6 GHz.

In an embodiment, the technical solutions in the embodiments of this application may be used in a case in which one cell assists another cell or a plurality of cells in recovering a link in a carrier aggregation (CA) scenario, or a case in which one cell in one cell group assists another cell or a plurality of cells in recovering a link in a DC scenario.

In this embodiment of this application, the "one cell" and the "another cell" may belong to a same cell group, or belong to different cell groups. For the different cell groups, a case in which one cell in a cell group 1 may assist another cell in a cell group 2 in recovering a link in a DC scenario is mainly described.

Optionally, a cell in the MCG assists a cell in the SCG in recovering a link.

Optionally, a cell in the SCG assists a cell in the MCG in recovering a link.

It should be further understood that in this application, the "cell" may be understood as a "serving cell" or a "carrier".

The communications system applicable to this application is merely an example for description, and the communications system applicable to this application is not limited thereto. For example, other quantities of network devices and terminal devices may alternatively be included in the communications system, or a single base station scenario, a multi-carrier aggregation scenario, a dual connectivity scenario, or a device-to-device (D2D) communication scenario may be used.

In the embodiments of this application, to detect a link failure and recover a failed link, the network device needs to configure, for the terminal device, a reference signal resource set (for example, a beam failure detection RS resource configuration, a beam failure detection RS, or failure detection resources) used for beam failure detection and a reference signal resource set (a candidate beam RS list, a candidate beam RS identification resource, a beam failure candidate beam resource, or a candidate beam identification RS) (also referred to as a candidate reference signal resource set) used to recovery a link between the terminal device and the network device. In addition, a reference signal used to detect a link failure may also be implicitly indicated, and a reference signal associated with a TCI indicating a PDCCH is used as the reference signal used to detect the link failure. The reference signal is a reference signal that meets a QCL relationship with a DMRS on the PDCCH and that is periodically sent. An RS in a beam failure detection RS set and a demodulation reference signal on a physical downlink control channel PDCCH meet a QCL relationship or use a same TCI state as the PDCCH. When channel quality information (for example, reference signal received power (RSRP), a channel quality indicator (CQI), a block error rate (BLER), a signal to interference plus noise ratio (SINR), and a signal-to-noise ratio (SNR)) of some or all reference signals in the set is less than a preset threshold, it is determined that the link fails. That channel quality information is less than a preset threshold may be that the channel quality information is less than the preset threshold for W consecutive times or is less than the preset threshold for W times in a specific time period. Optionally, the preset threshold may be the same as a radio link failure out-of-synchronization (radio link failure (out of sync)OOS) threshold.

Optionally, the link failure means that signal quality of a reference signal used for PDCCH beam failure detection is less than or equal to the preset threshold. In the embodiments of this application, these concepts have a same meaning. After the link fails, the terminal device needs to select, from the reference signal resource set, a reference signal resource whose channel quality information (for example, RSRP, RSRQ, and a CQI) is greater than the preset threshold, to recover the link.

Optionally, the preset threshold may be configured by the network device. Herein, the beam failure detection RS is used by the terminal device to detect channel quality of a transmit beam of the network device, and the transmit beam is a beam used when the network device communicates with the terminal device.

The candidate beam identification RS is a reference signal set used by the terminal device to initiate link reconfiguration after the terminal device determines that a communication link fault occurs on the transmit beam of the network device.

In the embodiments of this application, the link failure may also be referred to as a communication fault, a communication failure, a link fault, a beam failure, a beam fault, a communication link failure, a communication link fault, or the like.

In the embodiments of this application, the link failure recovery may also be referred to as recovery of communication between the network device and the terminal device, communication fault recovery, link failure recovery, link fault recovery, beam failure recovery, beam fault recovery, communication link failure recovery, communication link fault recovery, link reconfiguration, or the like.

In a specific implementation, the two sets, namely, the reference signal resource set used for the beam failure detection and the reference signal resource set used to recover the link between the terminal device and the network device may alternatively have other names. This is not specifically limited in this application.

In the embodiments of this application, link failure recovery request information may also be referred to as communication fault recovery request information, communication failure recovery request information, link fault recovery request information, beam failure recovery request information, beam fault recovery request information, communication link failure recovery request information, communication link fault recovery request information, link reconfiguration request information, reconfiguration request information, or the like.

In the embodiments of this application, link failure response information may also be referred to as link failure recovery response information, communication failure response information, beam failure recovery response information, beam failure response information, communication link fault recovery response information, communication link fault response information, communication failure recovery response information, communication link failure response information, beam fault recovery response information, beam fault response information, link reconfiguration response information, link fault recovery response information, link fault response information, link failure recovery response information, link failure response information, communication fault recovery response information, communication fault response information, reconfiguration response information, or the like.

In the embodiments of this application, optionally, the link failure recovery request may indicate that a signal is sent on a resource used to carry a communication failure recovery request. The link failure recovery response information may indicate that downlink control information (DCI) whose cyclic redundancy check (CRC) is scrambled by using a cell radio network temporary identifier (C-RNTI) is received on a control resource set and/or a search space set used to send a communication failure recovery response. The communication failure recovery response information may alternatively be scrambled by using other information. This is not limited in the embodiments of this application.

It should be understood that in the embodiments of this application, the communication failure, the communication failure recovery, the communication failure recovery request information, and the communication failure recovery response information may alternatively have other names. This is not specifically limited in this application.

In the embodiments of this application, an uplink resource set that is configured by the network device for a first cell and that is used to send indication information indicating that a link failure occurs in the first cell is referred to as a first uplink resource set. A quantity of PRACH resources included in the first uplink resource set is equal to a quantity of downlink reference signals in a candidate reference signal resource set of the first cell. In other words, one PRACH resource is associated with one downlink reference signal. When there is uplink and downlink reciprocity, a transmit beam used when the terminal device sends information on one PRACH resource is a transmit beam corresponding to a receive beam of a downlink reference signal associated with the PRACH resource. In other words, the terminal device may send the information on the PRACH resource by using the transmit beam corresponding to the receive beam. When there is no uplink and downlink reciprocity, in an optional implementation, one PRACH resource in the first uplink resource set is associated with one downlink reference signal and one uplink reference signal. The terminal device may determine, based on the determined PRACH resource associated with the downlink reference signal, the uplink reference signal associated with the PRACH resource, to send information on the PRACH resource by using a transmit beam of the uplink reference signal. In another optional implementation, the PRACH resource may not be associated with the downlink reference signal, but information about the downlink reference signal may be reported again by using a specially configured PUSCH resource.

To be specific, in an uplink and downlink reciprocity scenario, if a downlink fails, an uplink also fails. In this case, the terminal device sends a PRACH by using the transmit beam corresponding to the receive beam of the identified downlink reference signal. Therefore, a plurality of PRACH resources need to be configured. In an uplink and downlink non-reciprocity scenario, if a downlink fails, an uplink may or may not fail.

If the uplink also fails, a corresponding uplink reference signal needs to be searched for to send a PRACH. In this case, different PRACH resources may need to be associated with different uplink reference signals, but does not need to be associated with downlink reference signals in this case. The downlink reference signal may be reported again by using a third uplink resource, namely, a PUSCH, in the following embodiments. If the uplink does not fail, a PRACH may be sent by using an active PUCCH beam or another available uplink beam. In this case, the PRACH may be associated with a downlink reference signal, and the downlink reference signal does not need to be reported again by using a PUSCH resource.

However, when the downlink fails, the terminal device does not know whether the uplink fails. Therefore, in the uplink and downlink non-reciprocity scenario, the PRACH resource is associated with the uplink reference signal, and then information about the downlink reference signal is reported by using a dedicated PUSCH resource.

In the embodiments of this application, information about a spatial relation parameter may include quasi-colocation (QCL) assumption information, spatial relation information, and the like. In the embodiments of this application, the information about the spatial relation parameter is information about a spatial relation parameter used to send or receive a channel and/or a signal of the first cell. The channel may include a control channel, a data channel, a channel carrying a reference signal, and the like. The channel may be a PUCCH, a PDCCH, a PUSCH, a PRACH, a physical downlink shared channel (PDSCH), or the like. The signal may be a channel state information reference signal (CSI-RS), a sounding reference signal (SRS), a synchronization signal broadcast channel block (synchronous signal/PBCH block, SSB), or the like. Alternatively, the signal may be a channel state information reference signal, a tracking reference signal (TRS), a synchronization signal broadcast channel block (synchronous signal/PBCH block, SSB), or the like.

The quasi-colocation (QCL) information may also be referred to as colocation assumption information or quasi-colocation assumption information. The QCL assumption information is used to assist in describing information such as receive side beamforming information and a receiving procedure of the terminal device. It should be understood that spatial characteristic parameters of two reference signals or channels that meet a QCL relationship are the same, so that a spatial characteristic parameter of a target reference signal can be inferred based on a resource identifier of a source reference signal.

The spatial relation information is used to assist in describing information such as transmit side beamforming information and a transmitting procedure of the terminal device. It should be understood that spatial characteristic parameters of two reference signals or channels that meet the spatial relation information are the same, so that a spatial characteristic parameter of a target reference signal can be inferred based on a resource identifier of a source reference signal. The terminal device may transmit the target reference signal based on a transmit beam of a reference signal resource identifier associated with the spatial relation information.

The receive beam is equivalent to a spatial transmission filter, a spatial domain transmission filter, a spatial domain receive filter, or a spatial receive filter. The transmit beam may be equivalent to a spatial domain filter, a spatial domain transmission filter, a spatial domain transmit filter, or a spatial transmit filter. The information about the spatial relation parameter is equivalent to a spatial filter (spatial domain transmission/receive filter). Optionally, the spatial filter usually includes a spatial transmit filter and/or a spatial receive filter. The spatial filter may also be referred to as a spatial domain transmit filter, a spatial domain receive filter, a spatial transmission filter, a spatial domain transmission filter, or the like. A receive beam on a terminal device side and a transmit beam on a network device side each may be a downlink spatial filter, and a transmit beam on the terminal device side and a receive beam on the network device side each may be an uplink spatial filter.

The spatial characteristic parameter includes one or more of the following parameters: an angle of arrival (AoA), a dominant angle of arrival AoA, an average angle of arrival, a power angular spectrum (PAS) of an angle of arrival, an angle of departure (AoD), a dominant angle of departure, an average angle of departure, a power angular spectrum of an angle of departure, terminal device transmit beamforming, terminal device receive beamforming, spatial channel correlation, base station transmit beamforming, base station receive beamforming, an average channel gain, an average delay, a delay spread, a Doppler spread, a Doppler shift, a spatial reception parameter (spatial Rx parameters), a spatial transmission parameter (spatial Tx parameters), and the like. A characteristic of a spatial channel between antenna ports of a source reference signal and a target reference signal is described by using these spatial characteristic parameters, to help the terminal device determine information such as receive side beamforming or a receiving processing process based on the QCL assumption information, or help the terminal device determine information such as transmit side beamforming or a transmitting processing process based on the spatial relation information.

The transmission configuration indicator (TCI) state indicates that one TCI state may include one or two referenced reference signals and an associated QCL type. The QCL type may be classified into four categories: A, B, C, and D that are different combinations or selections of {Doppler shift, Doppler spread, average delay, delay spread, and spatial Rx parameter}. The TCI state includes the QCL information, or the TCI state indicates the QCL information.

In the embodiments of this application, the control resource set (CORESET) is one or more resource sets configured by the network device for the terminal device, and is used to send a PDCCH. The network device may send a control channel to the terminal device on the control resource set. In addition, the network device may further configure, for the terminal device, another configuration associated with the control resource set, for example, a search space set. Configuration information of all control resource sets is different, for example, a frequency domain width difference and a time domain length difference. Further, the control resource set may be a CORESET, a control region, an enhanced physical downlink control channel (E-PDCCH) set, or the like defined in a 5G mobile communications system.

In the embodiments of this application, a PDCCH configured in a common search space (CSS) set is mainly used to schedule one or more of the following information: remaining system information (RMSI), other system information (OSI), a paging message, and a random access message (including a second message (Message 2) or a fourth message (Message 4)).

Figure 4:
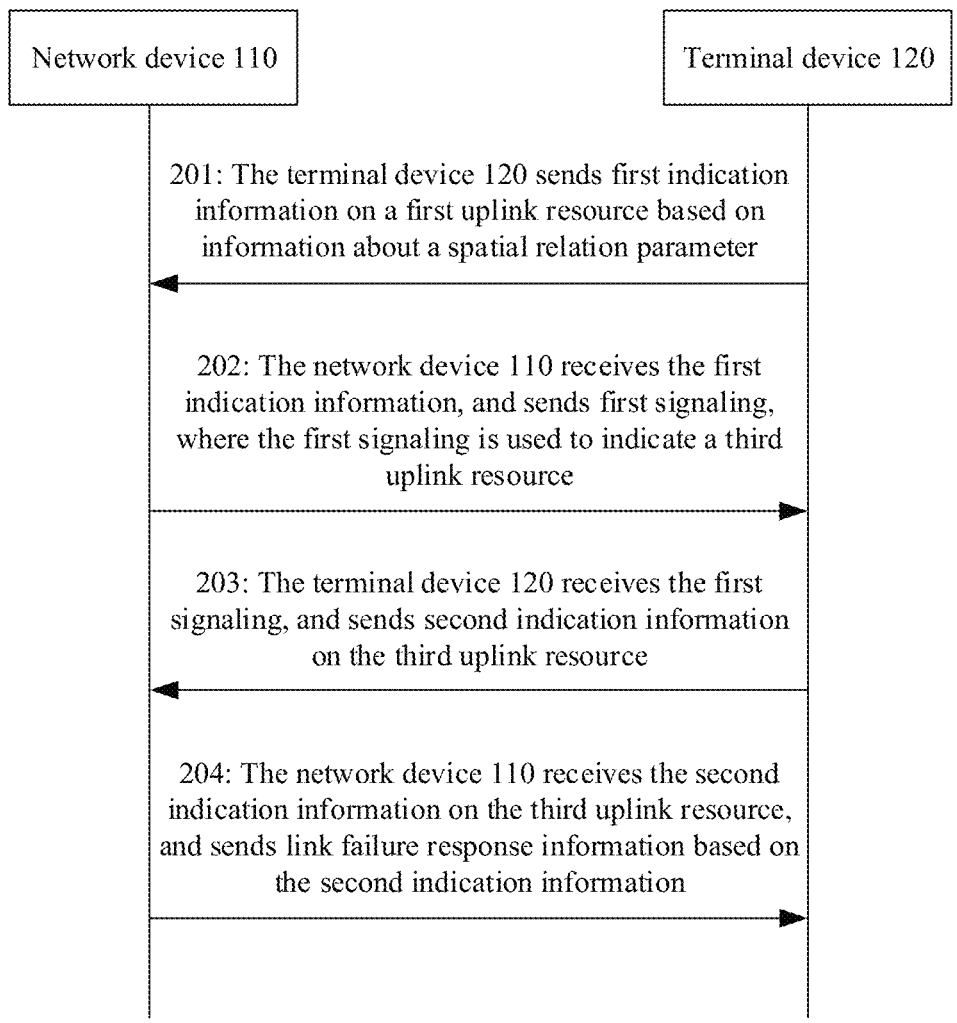
FIG. 4 is a schematic flowchart of another link failure recovery method according to an embodiment of this application.
Figure 5:
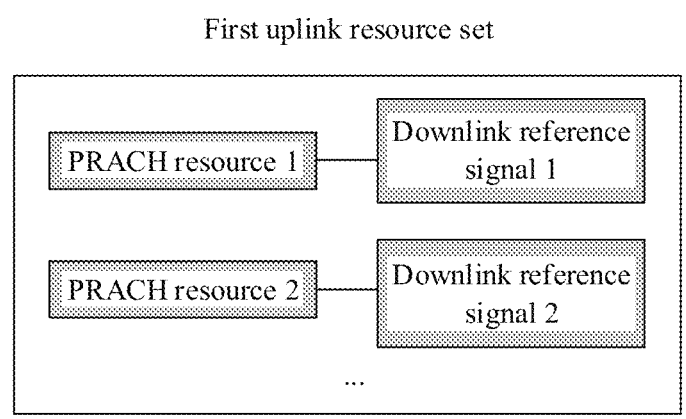
FIG. 5 is a schematic diagram of a first uplink resource set according to an embodiment of this application.
Figure 6:
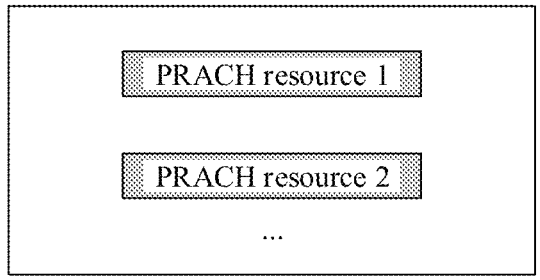
FIG. 6 is a schematic diagram of a second uplink resource set according to an embodiment of this application.
Figure 7:
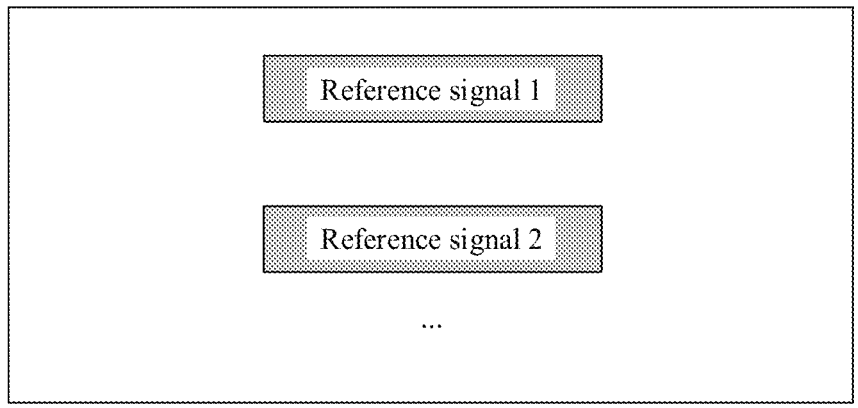
FIG. 7 is a schematic diagram of a reference signal associated with QCL information or spatial relation information according to an embodiment of this application.
Figure 7:
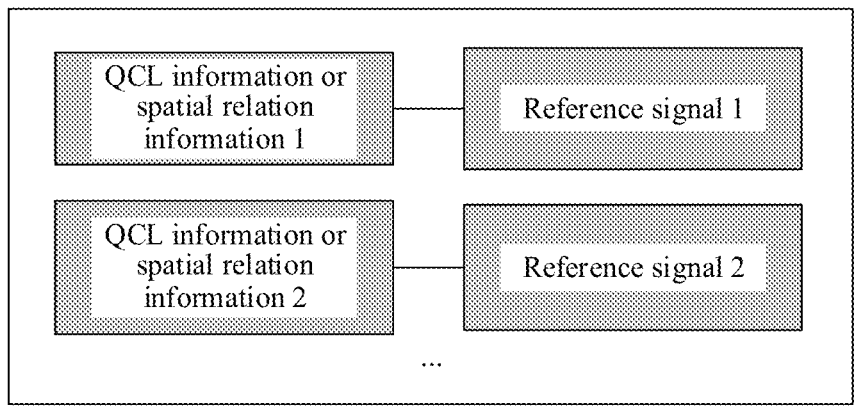

In the embodiments of this application, "association" means that different information configured by the network device for the terminal device includes each other, one piece of information includes an index or an identifier of another piece of information, there is a correspondence between two pieces of information, or the like. For example, as shown in FIG. 4, a first uplink resource set includes a PRACH resource that is configured by the network device for a first cell and that is used to send link failure recovery request information of the first cell, and further includes a downlink reference signal corresponding to each PRACH resource. For another example, as shown in FIG. 6, a second uplink resource set includes M PRACH resources, and the M PRACH resources have no corresponding downlink reference signal. For another example, as shown in FIG. 7, for a reference signal associated with QCL assumption information or spatial relation information, the QCL assumption information or the spatial relation information may include reference signal information, for example, an index or an identifier of the reference signal, a piece of configuration information may include a correspondence between the QCL assumption information or spatial relation information and reference signal information, or the like. This is not limited in this embodiment of this application. The configuration information may be a control resource set or the like.

Optionally, the first uplink resource set may include a plurality of PRACH resources used to send the link failure recovery request information of the first cell, a downlink reference signal corresponding to each PRACH resource, and an uplink parameter signal corresponding to each PRACH resource. Optionally, the second uplink resource set may include M PRACH resources used to send link failure recovery request information of N second cells, and each PRACH resource may have a corresponding downlink reference signal, but may be in an invalid state. The associated reference signal is invalid or not configured, in other words, beam information of the PRACH resource is not configured, so that a transmit beam of first indication information is dynamically or semi-persistently configured along with a serving beam (namely, active QCL information or spatial relation information) of the first cell. These association relationships may be configured by the network device, or may be determined in a predefined manner.

In the embodiments of this application, the first indication information indicates that a link failure occurs in a $i^{th}$ cell in the N second cells. The first indication information can indicate different information based on different first uplink resources. For example, if the first uplink resource is a PRACH resource in the first uplink resource set, the first indication information indicates that a link failure occurs in a cell of the terminal device. If the first uplink resource is a PRACH resource that is in the first uplink resource set and that corresponds to active QCL information or spatial relation information of the first cell, and it is agreed that a PRACH resource that is in the first uplink resource set and that corresponds to inactive QCL information or spatial relation information of the first cell is used to send the link failure request information of the first cell, the first indication information may indicate that a link failure occurs in a cell in the N second cells. Alternatively, if the first uplink resource is a PRACH resource that is in the second uplink resource set and that corresponds to a $i^{th}$ cell, the first indication information may indicate that a link failure occurs in a $i^{th}$ cell. Alternatively, if the first uplink resource is a PUCCH resource that is configured by the network device and that is used to send the link failure recovery request information of the N second cells, the first indication information is the link failure recovery request information. Related descriptions are provided below.

The link failure recovery request information includes at least one of following: identification information of a cell in which a link failure occurs and reference signal information. The link failure response information is used to notify the terminal device that the network device has received the first indication information, second indication information, and/or the like.

A plurality of embodiments provided in this application are described below with reference to the communications system shown in FIG. 1. It is assumed that in the communications system 100, the network device 110 includes a first cell and N second cells, and a $i^{th}$ cell is one of the N second cells, where N is an integer greater than or equal to 1. Optionally, the first cell may be a cell in which a resource used to send scheduling request information for a $i^{th}$ cell is located.

When the network device for link failure recovery provided in this application is applied to the communications system shown in FIG. 2, for example, a $i^{th}$ cell is a cell in the network device 220, and the first cell is a cell in the network device 210, a difference from the communications system shown in FIG. 1 lies in that when receiving identification information of a $i^{th}$ cell and candidate reference signal information (for example, third reference signal information and/or fourth reference signal information), the network device 210 may send the identification information and the candidate reference signal information to the network device 220, and the network device 220 sends link failure response information on a downlink resource of a $i^{th}$ cell by using the candidate reference signal information. In the communications system shown in FIG. 1, when the network device 110 receives identification information of a $i^{th}$ cell and candidate reference signal information (for example, third reference signal information and/or fourth reference signal information), the network device 110 may send link failure response information on a downlink resource of a $i^{th}$ cell by using the candidate reference signal information. Therefore, in the following content described with reference to the communications system shown in FIG. 1, except that in the two communications systems, execution bodies that send the link failure response information may be different, other content, for example, an optional implementation, is applicable to the communications system shown in FIG. 2.

Figure 3:
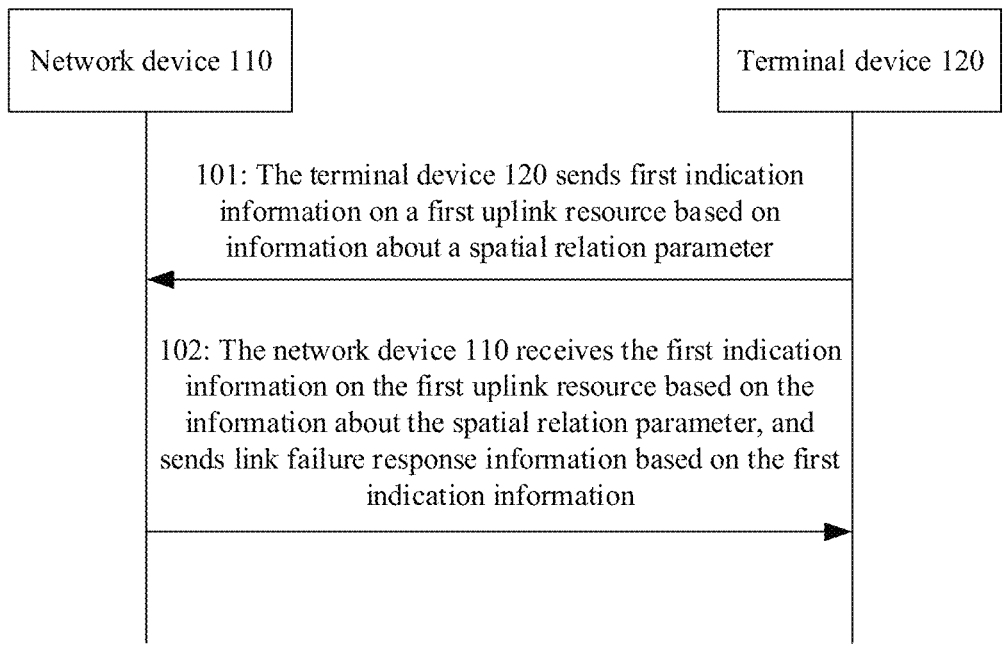
FIG. 3 is a schematic flowchart of a link failure recovery method according to an embodiment of this application.

FIG. 3 is a schematic flowchart of a link failure recovery method according to an embodiment of this application. Based on the communications system shown in FIG. 1, when determining that a link failure occurs in a $i^{th}$ cell, the terminal device may perform the following steps to recover a link in a $i^{th}$ cell.

101: The terminal device 120 sends first indication information on a first uplink resource based on information about a spatial relation parameter.

The information about the spatial relation parameter is information about a spatial relation parameter used to send or receive a channel and/or a signal of a first cell; the first indication information indicates that a link failure occurs in a $i^{th}$ cell in N second cells; and the first uplink resource is an uplink resource of the first cell.

102: The network device 110 receives the first indication information on the first uplink resource based on the information about the spatial relation parameter, and sends link failure response information based on the first indication information.

The link failure response information is used to notify the terminal device that the network device has learned of identification information of a cell in which a link failure occurs and candidate reference signal information.

It can be learned that in this implementation, the network device does not need to configure a plurality of uplink resources that are associated with a plurality of reference signal resources of a second cell and that are used to indicate that a link failure occurs in the second cell, and the terminal device may notify, by using the information about the spatial relation parameter of the first cell and the uplink resource of the first cell, the network device that the link failure occurs, so that the network device can return the link failure response information, thereby reducing resource overheads.

In the implementation shown in FIG. 3, the first indication information further needs to indicate at least one of following: identification information of a $i^{th}$ cell, third reference signal information, and fourth reference signal information. Therefore, the network device can send the link failure response information based on the first indication information. In this embodiment of this application, the third reference signal information is information about a reference signal that is in a candidate reference signal resource set and whose channel quality is greater than or equal to a first threshold, and the fourth reference signal information is information about a reference signal that is in the candidate reference signal resource set and whose channel quality is less than or equal to a second threshold. The reference signal resource set is a reference signal resource set corresponding to a $i^{th}$ cell. Optionally, a third reference signal corresponding to the third reference signal information and a fourth reference signal corresponding to the fourth reference signal information are reference signals in a $i^{th}$ cell.

Optionally, the third reference signal is a downlink reference signal newly identified on a downlink (a link between the terminal device and the network device), and the third reference signal information includes a resource index of the third reference signal and/or quality information of the third reference signal.

It should be further understood that the third reference signal may be used by the network device to recover the downlink (the link between the network device and the terminal device).

It should be further understood that the downlink may also be understood as a link between the terminal device and the second network device in a $i^{th}$ cell.

Optionally, the fourth reference signal is a reference signal used to detect a downlink (a link between the terminal device and the network device) failure, or the fourth reference signal is a reference signal corresponding to a spatial relation parameter associated with the first downlink resource or a reference signal included in the spatial relation parameter. The fourth reference signal information includes a resource index of the fourth reference signal and/or quality information of the fourth reference signal.

It should be understood that the fourth reference signal may be one or more reference signals in a beam failure detection reference signal set beam failure detection RS set.

It should be further understood that optionally, the third reference signal and the fourth reference signal are reference signals in the second cell.

It should be further understood that the third reference signal and the fourth reference signal may be downlink reference signals.

For example, the third reference signal and the fourth reference signal are CSI-RSs, SSBs, DMRSs, or TRSs.

In an optional embodiment, in a link failure recovery process, the terminal device maintains a beam failure recovery timer or counter, to stop the link failure recovery process in a timely manner. The beam failure recovery timer is used to control a link failure recovery time, and the beam failure recovery counter is used to control a quantity of link failure recovery requests. To be specific, after the terminal device sends the first indication information on the first uplink resource based on the information about the spatial relation parameter, the network device may not receive the first indication information, or cannot send the link failure recovery response message. In this case, the terminal device continues to wait within duration specified by the timer, and/or send the first indication information for a plurality of times within a quantity of times specified by the counter, in other words, perform step 101 for a plurality of times. Therefore, a link failure recovery method also provided in this embodiment of this application may not include steps 102 and 103.

FIG. 4 is a schematic flowchart of another link failure recovery method according to an embodiment of this application. Compared with the link failure recovery method shown in FIG. 3, in the link failure recovery method shown in FIG. 4, the terminal device may send at least one of following: identification information of a $i^{th}$ cell, third reference signal information, and fourth reference signal information by using a dedicated physical uplink shared channel PUSCH resource configured by the network device. Compared with the link failure recovery method shown in FIG. 3, the link failure recovery method shown in FIG. 4 can reduce a payload of first indication information. In particular, a link failure is an emergency, and consequently a resource needs to be periodically reserved to send the first indication information at any time, so as to notify the network device that a link failure occurs. However, in this implementation, a PUCCH resource does not need to be periodically reserved, so that uplink resources can be saved.

Specifically, as shown in FIG. 4, the link failure recovery method may include the following steps:

201: The terminal device 120 sends first indication information on a first uplink resource based on information about a spatial relation parameter.

The information about the spatial relation parameter is information about a spatial relation parameter used to send or receive a channel and/or a signal of a first cell; the first indication information indicates that a link failure occurs in a cell in N second cells; and the first uplink resource is an uplink resource of the first cell.

202: The network device 110 receives the first indication information, and sends first signaling, where the first signaling indicates a third uplink resource.

Optionally, the third uplink resource is an uplink resource of the first cell. Optionally, the third uplink resource may alternatively be another cell in which no downlink failure occurs or a cell in which no uplink failure occurs.

In an optional implementation, the first signaling is media access control control element MAC-CE signaling or downlink control information (DCI) signaling.

In another optional implementation, the media access control (MAC) control element (CE) (MAC-CE) signaling or the DCI signaling is signaling specially used to indicate the third uplink resource.

A cyclic redundancy check (CRC) of the DCI may be scrambled by using a dedicated radio network temporary identifier, or the DCI carries a dedicated indication, to notify the terminal device that a PUSCH resource scheduled by the DCI is a resource used to send link failure recovery request information. For example, the dedicated radio network temporary identifier is a radio network temporary identifier other than a cell system information radio network temporary identifier (SI-RNTI), a random access radio network temporary identifier (RA-RNTI), a temporary cell radio network temporary identifier (TC-RNTI), a cell radio network temporary identifier (C-RNTI), a paging radio network temporary identifier (P-RNTI), an interruption radio network temporary identifier (INT-RNTI, a slot format indication radio network temporary identifier (SFI-RNTI), a transmit power control physical uplink shared channel radio network temporary identifier (TPC-PUSCH-RNTI), a transmit power control physical uplink control channel radio network temporary identifier (TPC-PUCCH-RNTI), a transmit power control sounding reference signal radio network temporary identifier (TPC-SRS-RNTI), a configured scheduling radio network temporary identifier (CS-RNTI), and a semi-persistent channel state information radio network temporary identifier (SP-CSI-RNTI), for example, a beam failure recovery radio network temporary identifier (BFR-RNTI). In this way, the terminal device knows, based on the DCI signaling, that the network device receives a beam failure request, and the PUSCH resource allocated by the network device by using the first signaling is used to report related information for beam failure recovery. For another example, the dedicated indication may be represented by using another status bit in the DCI, so that the terminal device determines whether the received PUSCH resource is used to report related information for beam failure recovery or used to report normal data.

203: The terminal device 120 receives the first signaling, and sends second indication information on the third uplink resource.

The second indication information indicates at least one of following: identification information of a $i^{th}$ cell, third reference signal information, and fourth reference signal information.

204: The network device 110 receives the second indication information on the third uplink resource, and sends link failure response information based on the second indication information.

Similarly, the third reference signal information is information about a reference signal that is in a candidate reference signal resource set of a $i^{th}$ cell and whose channel quality is greater than or equal to a first threshold, and the fourth reference signal information is information about a reference signal that is in the candidate reference signal resource set of a $i^{th}$ cell and whose channel quality is less than or equal to a second threshold.

It can be learned that in this implementation, the terminal device first sends the first indication information to notify the network device that a link failure occurs, and then the network device configures the third uplink resource for the terminal device by using the first signaling, so that the terminal device can report the at least one of the identification information of a $i^{th}$ cell, the third reference signal information, and the fourth reference signal information to the network device by using the third uplink resource, and the network device recovers a link in a $i^{th}$ cell. It can be learned that in this implementation, the network device does not need to configure an uplink resource for each downlink reference signal in a candidate reference signal resource set of a $i^{th}$ cell, but only needs to configure one third uplink resource, to recover a link, so that resource overheads can be greatly reduced. In other words, in this implementation, a large-capacity resource does not need to be periodically configured to wait, at any time, for the terminal to report related information indicating that a link failure occurs. Instead, the terminal device may first report information indicating that a link failure occurs in a cell, and then indicate to allocate a large-capacity resource by using aperiodic signaling, to report related information indicating that a link failure occurs.

In addition to the embodiments shown in FIG. 3 and FIG. 4, this application may further include other embodiments. For example, when the terminal device performs the link failure recovery method, after the terminal device sends the first indication information, the terminal device may fail to receive response information from the network device because an overall network status is relatively poor. In this case, compared with a prior-art manner in which an uplink resource needs to be configured for each downlink reference signal in a cell, the link failure recovery method can still greatly reduce uplink resource overheads. In conclusion, this is not limited in this embodiment of this application.

In this embodiment of this application, the information about the spatial relation parameter used to send the first indication information may include a plurality of implementations, the first uplink resource used to send the first indication information may also include a plurality of implementations, the first signaling may also include a plurality of implementations, a payload of the first indication information and/or a payload of the second indication information may also include a plurality of implementations, and the like. Related descriptions are provided below.

This embodiment of this application further relates to some of the foregoing content. To be specific, the information about the spatial relation parameter used to send the first indication information may include a plurality of implementations. Descriptions are provided below.

In an optional implementation, the information about the spatial relation parameter is quasi-colocation QCL assumption information used to receive a physical downlink control channel (PDCCH) of the first cell.

In other words, a transmit beam used to send the first indication information may be a transmit beam corresponding to a receive beam used to receive the PDCCH of the first cell. Usually, the method is applicable to a reciprocity scenario. For example, a filter that forms a receive beam is the same as a filter that forms a transmit beam. In this implementation, the first indication information is sent on the first uplink resource based on the QCL assumption information used to receive the PDCCH of the first cell, to avoid a case in which when QCL assumption information associated with one downlink reference signal in a candidate reference signal set is used in the prior art, an associated uplink resource needs to be configured for each downlink reference signal to send indication information indicating that a link failure occurs. Therefore, resource overheads are reduced.

In an example, the terminal device may detect a PDCCH in a search space set associated with a resource such as a CORESET ID 1, a CORESET ID 2 or a CORESET ID 3, and may detect a same PDCCH or different PDCCHs on different time-frequency resources. Therefore, in this example, the first indication information may be sent by using the QCL assumption information of a control resource set with a smallest index value or identifier in the control resource sets.

In an example, the QCL information is configured by using a CORESET as a unit, but is not configured or activated by using a PDCCH or a search space set as a unit. Therefore, if a CORESET on which the PDCCH is detected is determined, the PDCCH is received by using QCL information corresponding to the CORESET. Correspondingly, the QCL information is further used to send the first indication information.

In another example, the PDCCH may be a PDCCH detected on a time-frequency resource jointly determined by using a common search space set and a CORESET associated with the common search space set. To be specific, the QCL assumption information used to send the first indication information may be QCL assumption information of a common search space CSS set of the first cell. A transmit beam associated with the QCL assumption information of the CSS has good coverage, and the first indication information is sent by using the transmit beam, so that a probability that the network device receives the first indication information can be increased. Alternatively, the QCL assumption information used to send the first indication information may be QCL assumption information of a control resource set in which common search space CSS of the first cell is located.

In another optional implementation, the information about the spatial relation parameter used to send the first indication information is spatial relation information used to send a physical uplink control channel (PUCCH) of the first cell. Usually, when there is no uplink and downlink reciprocity, the first indication information may be sent in this implementation.

In an example, the spatial relation information of the PUCCH may be spatial relation information of a PUCCH with a smallest index value or identifier in one or more PUCCHs of the first cell.

In another example, the spatial relation information of the PUCCH may be spatial relation information of a PUCCH used to send scheduling request information for a $i^{th}$ cell. To be specific, when determining that a link failure occurs in a $i^{th}$ cell, the terminal device may send the first indication information by using the spatial relation information of the PUCCH used to send the scheduling request information for a $i^{th}$ cell.

In still another optional implementation, the information about the spatial relation parameter used to send the first indication information is information about a spatial relation parameter on a synchronization signal broadcast channel block (synchronous signal/physical broadcast channel block, SSB) resource of the first cell. To be specific, the terminal device sends the first indication information by using a transmit beam corresponding to a receive beam used to receive an SSB on the SSB resource. Optionally, the SSB resource is an SSB resource used when the terminal device initially accesses the first cell. Usually, the method is applicable to a reciprocity scenario. For example, a filter that forms a receive beam is the same as a filter that forms a transmit beam.

In still another optional implementation, the information about the spatial relation parameter used to send the first indication information is spatial relation information of a channel used to carry link failure recovery request information of the first cell.

In the implementation in which the information about the spatial relation parameter used to send the first indication information is spatial relation information of a channel used to carry link failure recovery request information of the first cell, when a link failure occurs in the first cell, the following cases may be included.

Case 1: The terminal device first determines that a link failure occurs in the first cell, and then determines that a link failure occurs in a $i^{th}$ cell in the N second cells.

In this case, the following time points are also included.

Time point 1: Before receiving link failure recovery response information of the first cell, the terminal device determines that a link failure occurs in a $i^{th}$ cell.

Time point 2: After receiving link failure recovery response information of the first cell, the terminal device determines that a link failure occurs in a $i^{th}$ cell.

Time point 3: After receiving reconfiguration signaling of the first cell, the terminal device determines that a link failure occurs in a $i^{th}$ cell.

Implementation 1

When determining that a link failure occurs in the first cell, the terminal device determines, based on channel quality of a reference signal in a candidate reference signal resource set corresponding to the first cell, a reference signal whose channel quality is greater than a preset threshold, and sends, by using spatial relation information associated with the reference signal, the link failure recovery request information of the first cell on a PRACH resource associated with the reference signal.

In this case, after sending the link failure recovery request information of the first cell, the terminal device may send the first indication information by using the spatial relation information of the channel that carries the link failure recovery request information of the first cell.

The implementation 1 may be applied to scenarios corresponding to the time point 1 and the time point 2. To be specific, after sending the link failure recovery request information of the first cell, the terminal device may send the first indication information.

Implementation 2

The terminal device may send the first indication information after receiving link failure recovery response information of the first cell. The terminal device may send the first indication information by using spatial relation information of a channel that carries the link failure recovery response information of the first cell.

When determining that a link failure occurs in the first cell, the terminal device may send, by using spatial relation information associated with a plurality of downlink reference signals, the link failure recovery request information of the first cell within a time specified by a link failure recovery timer and/or a quantity of times specified by a link failure recovery counter, and reliability of a receive beam on which the link failure recovery response information of the first cell can be received or reliability of the information about the spatial relation parameter may be better. Therefore, the first indication information is sent by using the spatial relation information of the channel that carries the link failure recovery response information of the first cell, so that a probability that the network device receives the first indication information can be increased.

Therefore, the implementation 2 may be applied to scenarios corresponding to the time point 1 and the time point 2. To be specific, the terminal device sends the first indication information after receiving the link failure recovery response information of the first cell.

Implementation 3

After receiving reconfiguration information of a control channel of the first cell, the terminal device may determine, by using the reconfiguration information, that a link in the first cell is successfully recovered, and then send the first indication information. In this case, the terminal device may send the first indication information by using the reconfiguration information. To be specific, after the link has been reestablished in the first cell, the terminal device may send the first indication information by using active QCL assumption information or spatial relation information of the first cell, for example, the implementations in the information about the spatial relation parameter, for example, QCL information used to receive a PDCCH of the first cell or spatial relation information used to send a PUCCH of the first cell.

It can be learned that compared with the foregoing implementations, in this implementation, the terminal device sends the first indication information by using the reconfiguration information, so that a probability that the network device receives the first indication information can be greatly increased. Therefore, when the implementation 3 is used in scenarios corresponding to the time points 1 to 3, a link in a $i^{th}$ cell is to be recovered, in other words, the first indication information is to be sent, only after the first cell is completely and successfully recovered.

Implementation 4

A time point at which the terminal device recovers a link in the first cell may be irrelevant to a time point at which the terminal device recovers a link in the second cell. For example, when determining that a link failure occurs in the first cell, the terminal device performs a link failure recovery related operation on the first cell, and when determining that a link failure occurs in a $i^{th}$ cell, the terminal device also performs a link failure recovery related operation on the second cell.

The information about the spatial relation parameter used by the terminal device to send the first indication information for a $i^{th}$ cell may be the spatial relation information of the channel used to carry the link failure recovery request information of the first cell.

In this implementation, the foregoing time points do not need to be considered, and therefore the network device can be notified in a timelier manner that a link failure occurs in a cell, so that the network device can return related response information as soon as possible.

Case 2: The terminal device determines that link failures occur in both the first cell and a $i^{th}$ cell. In this case, any one of the foregoing implementations 1 to 4 may be used.

Case 3: The terminal device first determines that a link failure occurs in a $i^{th}$ cell, and then determines that a link failure occurs in the first cell.

For example, after determining that a link failure occurs in a $i^{th}$ cell, the terminal device sends the first indication information by using active QCL assumption information or spatial relation information of the first cell. However, a link failure also occurs in the first cell before the terminal device receives response information returned by the network device for a $i^{th}$ cell. In this case, the terminal device may send the first indication information by performing the method in any one of the foregoing implementations 1 to 4. Alternatively, the terminal device may send the first indication information for a plurality of times with reference to the implementations in the information about the spatial relation parameter, for example, QCL information used to receive a PDCCH of the first cell or spatial relation information used to send a PUCCH of the first cell, until the terminal device receives the response information from the network device.

It can be learned that the implementations in the information about the spatial relation parameter used to send the first indication information are described in the content, so that the terminal device notifies the network device in a timely manner that a link failure occurs in a cell.

This embodiment of this application further relates to some of the content. To be specific, the first uplink resource used to send the first indication information may include a plurality of implementations. Details are described below.

In an optional implementation, in the embodiment shown in FIG. 3, the first indication information includes at least one of following: identification information of a $i^{th}$ cell, third reference signal information, and fourth reference signal information. Therefore, the first uplink resource may be a physical uplink control channel PUCCH resource that is configured on the uplink resource of the first cell and that is specially used to send link failure recovery request information of the N second cells.

Optionally, the network device may configure only one PUCCH resource for the N second cells. In this way, compared with the prior art in which an uplink resource associated with each downlink reference signal needs to be configured for each cell, in this implementation, the link failure recovery request information is sent by using the PUCCH resource in all the second cells, so that resource overheads can be greatly reduced. For example, if a cell that is in the N second cells and in which a link failure occurs is determined, related information indicating that a link failure occurs may be reported by using the PUCCH resource. For another example, when link failures simultaneously occur in a plurality of cells in the N second cells, a link in one cell may be first selected to be recovered, and then a link in another cell is recovered.

Optionally, the network device may configure a plurality of PUCCH resources for the N second cells, but a total quantity of resources occupied by the plurality of PUCCH resources is less than a total quantity of resources on which an uplink resource associated with each downlink reference signal is configured for each cell in the prior art. For example, a corresponding quantity of PUCCHs may be configured for the second cell based on a quantity of second cells. For another example, a quantity of configured PUCCHs is periodically specified based on network reliability.

In another optional implementation, in the embodiment shown in FIG. 4, the second indication information may be used to indicate at least one of following: identification information of a $i^{th}$ cell, third reference signal information, and fourth reference signal information. Therefore, a payload of the first indication information is relatively small.

In an example, the first uplink resource is a physical random access channel PRACH resource in a first uplink resource set, and the first uplink resource set is a set of resources that are configured for the first cell and that are used to send the link failure recovery request information of the first cell. In this example, the first indication information can be quickly sent.

When a link failure also occurs in the first cell, for example, in Cases 1 to 3 described above, the first uplink resource may be a PRACH resource that is in a first uplink resource set and that is used to send the link failure recovery request information of the first cell.

In another example, if no link failure occurs in the first cell, or the link is successfully recovered after the reconfiguration information is received in the first cell, the first uplink resource may be a PRACH resource that is in a first uplink resource set and that is associated with a first reference signal, and the first reference signal is a reference signal associated with active QCL information or spatial relation information of the first cell. In this example, because channel quality of the reference signal associated with the active QCL information or spatial relation information is relatively high, a probability of successfully sending the first indication information can be increased.

The first reference signal may be a downlink reference signal, for example, a CSI-RS, an SSB, or a TRS. Optionally, the reference signal may be an uplink reference signal, for example, an SRS. A second reference signal may be a downlink reference signal, for example, a CSI-RS, an SSB, or a TRS. Optionally, the reference signal may be an uplink reference signal, for example, an SRS.

Further, in the foregoing example, it is specified that the first uplink resource is an uplink resource associated with a reference signal associated with active QCL information or spatial relation information of the first cell. In this case, a PRACH resource that is in the first uplink resource set and that is associated with a second reference signal is used to send the link failure recovery request information of the first cell, and the second reference signal is a reference signal associated with inactive QCL information or spatial relation information of the first cell. In other words, a protocol agreement or a signaling configuration may be completed in advance, and the first uplink resource used to send indication information indicating that link failures occur in the N second cells is the PRACH resource that is in the first uplink resource set and that is associated with the reference signal associated with the active QCL information or spatial relation information. In addition, a protocol agreement or a signaling configuration is completed in advance, and the uplink resource used to send indication information indicating that a link failure occurs in the first cell is a PRACH resource that is in the first uplink resource set and that is associated with the reference signal associated with the inactive QCL information or spatial relation information. In this way, when receiving the indication information that indicates that the link failure occurs and that is sent on the PRACH resource associated with the reference signal associated with the active QCL information or spatial relation information, the network device may determine that the link failure occurs in a cell in the second cells. When receiving the indication information that indicates that the link failure occurs and that is sent on the PRACH resource associated with the reference signal associated with the inactive QCL information or spatial relation information, the network device may determine that the link failure occurs in the first cell.

The active QCL information is active QCL information used to receive a PDCCH of the first cell, and the active spatial relation information is active spatial relation information used to send a PUCCH of the first cell. The inactive QCL information is inactive QCL information used to receive a PDCCH of the first cell, and the inactive spatial relation information is inactive spatial relation information used to send a PUCCH of the first cell. In other words, the active QCL information is QCL information that is actually used and that is determined in a plurality of pieces of candidate QCL information, and the inactive QCL information is QCL information that is not actually used in a preset time period. Correspondingly, the active spatial relation information is spatial relation information that is actually used and that is determined in a plurality of pieces of candidate QCL information, and the inactive spatial relation information is spatial relation information that is not actually used in a preset time period.

For example, the first uplink resource set includes 16 PRACH resources that are respectively associated with 16 downlink reference signals (a CSI-RS 1 to a CSI-RS 16). The network device configures, as the CSI-RS 1, a reference signal included in the QCL information used to receive the PDCCH of the first cell. When the terminal device determines that a beam failure occurs in the first cell, the terminal device searches the CSI-RS 2 to the CSI-RS 16 for a downlink reference signal whose channel quality is greater than a preset threshold, and sends beam failure recovery request information of the first cell on a PRACH resource corresponding to the downlink reference signal. In this case, the network device knows that the beam failure occurs in the first cell, and knows that a new downlink beam recommended by the terminal device is the downlink reference signal associated with the PRACH resource. When the terminal determines that a beam failure occurs in a $i^{th}$ cell, the terminal device sends the first indication information for a $i^{th}$ cell on a PRACH resource (namely, a PRACH resource associated with a CSI-RS 1 resource) corresponding to a serving beam of the first cell.

In addition, this example is combined with the embodiment shown in FIG. 3. The network device may determine, based on the first indication information, that a link failure occurs in a cell in the N second cells. Therefore, the first signaling can be used to trigger candidate reference signal resource sets of the N second cells, and does not need to be used to periodically trigger or send each reference signal in the candidate reference signal resource sets of the N second cells, so that resource overheads can be reduced.

In another optional implementation, the network device may configure, for the N second cells on the uplink resource of the first cell, M PRACH resources used to send link failure recovery request information of the second cell, which are referred to as a second uplink resource set, where N is greater than or equal to M. A difference between a PRACH resource included in the second uplink resource set and a PRACH resource included in the first uplink resource set lies in that the PRACH resource included in the second uplink resource set is not associated with a downlink reference signal, or is associated with a downlink reference signal but is invalid, that is, is different from an uplink resource configured for each downlink reference signal in each cell in the prior art. Therefore, compared with the prior art, this implementation can still reduce resource overheads.

In addition, the terminal device sends the first indication information by using the PRACH resource in the second uplink resource set, so that when receiving the first indication information on the PRACH resource, the network device can learn that a link failure occurs in a cell in the N second cells.

For example, in combination with the embodiment shown in FIG. 4, the first signaling can be further used to trigger each reference signal in candidate reference signal resource sets of the N second cells, to prevent the network device from periodically triggering the candidate reference signal resource sets, so that resource overheads can be reduced.

In this implementation, when N is equal to M, one PRACH resource in the second uplink resource set has a one-to-one mapping with one of the N second cells. In this case, the first uplink resource used by the terminal device to send the first indication information is a PRACH resource that is in the second uplink resource set and that corresponds to a $i^{th}$ cell.

In addition, because one PRACH resource in the second uplink resource set has a one-to-one mapping with one of the N second cells, the network device can learn of the corresponding second cell based on a PRACH resource used to receive the first indication information. Therefore, the first indication information is further used to indicate identification information of a $i^{th}$ cell. It can be learned that in this case, the second indication information in the embodiment shown in FIG. 3 does not need to indicate the identification information of a $i^{th}$ cell. In addition, in this case, the network device may trigger a candidate reference signal resource set of a $i^{th}$ cell, and does not need to trigger candidate reference signal resource sets of all second cells.

In this implementation, when N is greater than M, one PRACH resource in the second uplink resource set corresponds to one of P second cell groups, the N second cells include the P second cell groups, and one second cell group includes one or more second cells, where P is an integer greater than or equal to 1 and less than N. In this case, the first uplink resource is a PRACH resource that is in the second uplink resource set and that corresponds to a second cell group to which a $i^{th}$ cell belongs.

If different second cell groups correspond to different PRACH resources, when sending the first indication information, the terminal device may use the PRACH resource corresponding to the second cell group to which a $i^{th}$ cell belongs. Correspondingly, when receiving the first indication information, the network device may learn of the corresponding second cell group based on the PRACH resource. Therefore, the first signaling can be used to trigger a candidate reference signal resource set corresponding to the second cell group, and does not need to be used to trigger candidate reference signal resource sets of all second cells, or does not need to be used to periodically trigger candidate reference signal resource sets of all second cells, thereby reducing resource overheads.

For example, if the P second cell groups are in a one-to-one correspondence with the M PRACH resources, the first indication information can further indicate identification information of a second cell group in which a $i^{th}$ cell in which a link failure occurs is located. Correspondingly, the first signaling can be used to trigger a candidate reference signal resource set of the second cell group.

For another example, when M=1, to be specific, the network device configures one PRACH resource for the N second cells, in other words, the second uplink resource set includes one PRACH resource, when the terminal device sends the first indication information by using the PRACH resource, the network device can learn, when receiving the first indication information, that a link failure occurs in a cell in the N second cells.

This embodiment of this application further relates to some content. To be specific, the payload of the first indication information and/or the payload of the second indication information may include a plurality of implementations. Details are described below.

In an optional implementation, when the first indication information or the second indication information indicates the identification information of a $i^{th}$ cell, and is further used to indicate the third reference signal information and/or the fourth reference signal information, the identification information of a $i^{th}$ cell and the third reference signal information and/or the fourth reference signal information are independently encoded.

The independent encoding indicates that the identification information and the third reference signal information and/or the fourth reference signal information are separately indicated by using different parts of bits. Only when identifying the identification information, the network device can learn of a quantity of bits of the third reference signal information and/or a quantity of bits of the fourth reference signal information, that is, can identify the third reference signal information and/or the fourth reference signal information.

In this embodiment of this application, a payload of the first indication information and/or a payload of the second indication information are/is related to the first uplink resource. Descriptions are provided below in different implementations.

In an implementation, the first uplink resource used to send the first indication information is a PUCCH resource that is configured by the network device for the N second cells and that is specially used to send the link failure recovery request information.

In this case, the first indication information needs to indicate identification information of a $i^{th}$ cell, and third reference signal information and/or fourth reference signal information. Because both the terminal device and the network device know a quantity of second cells, a quantity of bits of the identification information of a $i^{th}$ cell is a fixed value, for example, $[\log_2 N]$. A quantity of bits of the third reference signal information and/or a quantity of bits of the fourth reference signal information are/is related to a quantity of downlink reference signals in a candidate reference signal resource set of each cell identified by the identification information.

Therefore, when a payload of the first indication information is a fixed value, the quantity of bits of the third reference signal information is determined based on a candidate reference signal resource set with a largest quantity of downlink reference signals that is in a plurality of candidate reference signal resource sets corresponding to the N second cells, and the quantity of bits of the fourth reference signal information is determined based on a failure detection reference signal resource set with a largest quantity of downlink reference signals that is in a plurality of beam failure detection reference signal resource sets corresponding to the N second cells. It is assumed that the candidate reference signal resource set with the largest quantity of downlink reference signals includes Y downlink reference signals. Optionally, the payload of the first indication information may be determined based on $[\log_2 N]+[\log_2 Y]$.

When a payload of the first indication information is a non-fixed value, the quantity of bits of the third reference signal information changes with a quantity of downlink reference signals in a candidate reference signal resource set of a cell indicated by the identification information. The quantity of bits of the fourth reference signal information changes with a quantity of downlink reference signals in a beam failure detection reference signal resource set of a cell indicated by the identification information.

In another optional implementation, when the first uplink resource is a PRACH resource in the first uplink resource set, or when the first uplink resource is a PRACH resource that is in the first uplink resource set and that is associated with a downlink reference signal associated with active QCL assumption information or spatial relation information, the first indication information cannot be used to notify the network device of identification information of the cell in which the link failure occurs.

Therefore, a quantity of bits of the identification information in the second indication information is related to a total quantity of cells connected to the terminal device. If a payload of the second indication information is a fixed value, a quantity of bits of the third reference signal information in the second indication information is related to a candidate reference signal resource set with a largest quantity of downlink reference signals that is in candidate reference signal resource sets of all cells of the terminal device, and a quantity of bits of the fourth reference signal information is related to a beam failure detection reference signal resource set with a largest quantity of downlink reference signals that is in beam failure detection reference signal resource sets of all cells of the terminal device. If a payload of the second indication information is a non-fixed value, a quantity of bits of the third reference signal information in the second indication information changes with a quantity of downlink reference signals in a candidate reference signal resource set of a cell indicated by the identification information, and a quantity of bits of the fourth reference signal information changes with a quantity of downlink reference signals in a beam failure detection reference signal resource set of a cell indicated by the identification information.

In still another optional implementation, when the first uplink resource is a PRACH resource that is in the first uplink resource set and that is associated with a downlink reference signal associated with active QCL or spatial relation information, and the uplink resource used to send the link failure recovery request information of the first cell is a PRACH resource that is in the first uplink resource set and that is associated with a reference signal associated with inactive QCL information or spatial relation information; or when the first uplink resource is a PRACH resource in the second uplink resource set, because the first indication information can indicate that a link failure occurs in a cell in the N second cells, a quantity of bits of the identification information in the second indication information is related to N, for example, is $[\log_2 N[$.

Correspondingly, if a payload of the second indication information is a fixed value, a quantity of bits of the third reference signal information in the second indication information is related to a candidate reference signal resource set with a largest quantity of downlink reference signals that is in candidate reference signal resource sets of all cells in the N second cells, and a quantity of bits of the fourth reference signal information is related to a beam failure detection reference signal resource set with a largest quantity of downlink reference signals that is in beam failure detection reference signal resource sets of all cells in the N second cells. If a payload of the second indication information is a non-fixed value, a quantity of bits of the third reference signal information in the second indication information changes with a quantity of downlink reference signals in a candidate reference signal resource set of a second cell indicated by the identification information, and a quantity of bits of the fourth reference signal information changes with a quantity of downlink reference signals in a beam failure detection reference signal resource set of a second cell indicated by the identification information.

In still another optional implementation, when N is equal to M, to be specific, the first uplink resource is a PRACH resource that is in the second uplink resource set and that corresponds to a $i^{th}$ cell, the first indication information is further used to indicate identification information of a $i^{th}$ cell, and the second indication information does not need to include the identification information of a $i^{th}$ cell, but needs to include only third reference signal information and/or fourth reference signal information. The first indication information is further used to indicate the identification information of a $i^{th}$ cell. In other words, in this implementation, due to an association relationship between a PRACH resource in the second uplink resource set and each second cell, the network device can determine the identification information of the cell based on the PRACH resource on which the first indication information is received, but the first indication information does not include the identification information of the cell.

Therefore, if a payload of the second indication information is a fixed value, a quantity of bits of the third reference signal information is related to a candidate reference signal resource set with a largest quantity of downlink reference signals that is in candidate reference signal resource sets of all cells in the N second cells, and a quantity of bits of the fourth reference signal information is related to a beam failure detection reference signal resource set with a largest quantity of downlink reference signals that is in beam failure detection reference signal resource sets of all cells in the N second cells. If a payload of the second indication information is a non-fixed value, a quantity of bits of the third reference signal information is related to a quantity of downlink reference signals in a candidate reference signal resource set of a $i^{th}$ cell, and a quantity of bits of the fourth reference signal information is related to a quantity of downlink reference signals in a beam failure detection reference signal resource set of a $i^{th}$ cell.

In still another optional implementation, when the first uplink resource is a PRACH resource that is in the second uplink resource set and that corresponds to a second cell group to which a $i^{th}$ cell belongs, the first indication information is further used to indicate identification information of the second cell group to which a $i^{th}$ cell belongs, and the identification information in the second indication information may be intra-group identification information of a $i^{th}$ cell in the second cell group. When a payload of the second indication information is a fixed value, a quantity of bits of the identification information is determined based on a second cell group that is in the P second cell groups and that includes a largest quantity of second cells, a quantity of bits of the third reference signal information is related to a candidate reference signal resource set with a largest quantity of downlink reference signals that is in a plurality of candidate reference signal resource sets corresponding to the second cell group to which a $i^{th}$ cell belongs, and a quantity of bits of the fourth reference signal information is related to a beam failure detection reference signal resource set with a largest quantity of downlink reference signals that is in a plurality of beam failure detection reference signal resource sets corresponding to the second cell group to which a $i^{th}$ cell belongs. When a payload of the second indication information is a non-fixed value, a quantity of bits of the identification information is determined based on a quantity of second cells included in a second cell group to which a $i^{th}$ cell belongs, a quantity of bits of the third reference signal information is related to a quantity of downlink reference signals in a candidate reference signal resource set of a $i^{th}$ cell, that is, is related to a quantity of downlink reference signals in a candidate reference signal resource set of a cell indicated by the identification information, and a quantity of bits of the fourth reference signal information is related to a quantity of downlink reference signals in a beam failure detection reference signal resource set of a $i^{th}$ cell, that is, is related to a quantity of downlink reference signals in a beam failure detection reference signal resource set of a cell indicated by the identification information.

Figure 8:
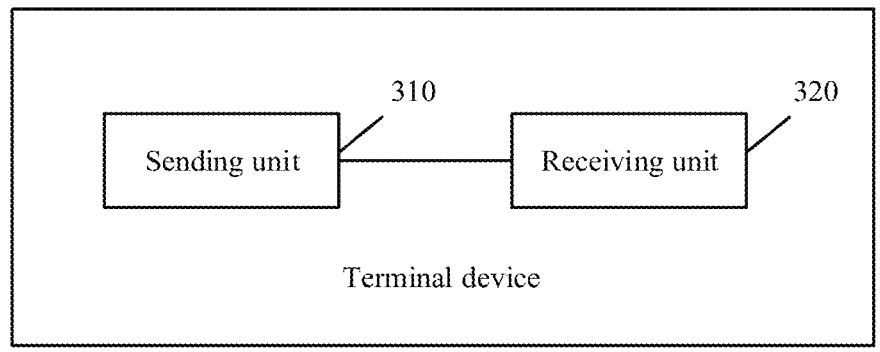
FIG. 8 is a schematic structural diagram of a terminal device according to an embodiment of this application.

FIG. 8 is a schematic structural diagram of a terminal device according to an embodiment of this application. As shown in FIG. 8, the terminal device may include a sending unit 310 and a receiving unit 320.

The sending unit 310 is configured to send first indication information on a first uplink resource based on information about a spatial relation parameter.

The information about the spatial relation parameter is information about a spatial relation parameter used to send or receive a channel and/or a signal of a first cell; the first indication information indicates that a link failure occurs in a $i^{th}$ cell in N second cells, where N is an integer greater than or equal to 1, and i is an integer greater than or equal to 1 and less than or equal to N; and the first uplink resource is an uplink resource of the first cell.

In another optional implementation, in the terminal device, the receiving unit is configured to receive first signaling, where the first signaling indicates a third uplink resource.

The sending unit is further configured to send second indication information on the third uplink resource, where the second indication information indicates at least one of following: identification information of a $i^{th}$ cell, third reference signal information, and fourth reference signal information.

The third reference signal information is information about a reference signal whose channel quality is greater than or equal to a first threshold, and the fourth reference signal information is information about a reference signal whose channel quality is less than or equal to a second threshold.

In addition to the foregoing steps, the sending unit and/or the receiving unit in the terminal device shown in FIG. 8 may further perform, with reference to at least one of the implementations in the foregoing method embodiments, a related operation performed by the terminal device in the link failure recovery method in the embodiments of this application. Details are not described herein again.

Figure 9:
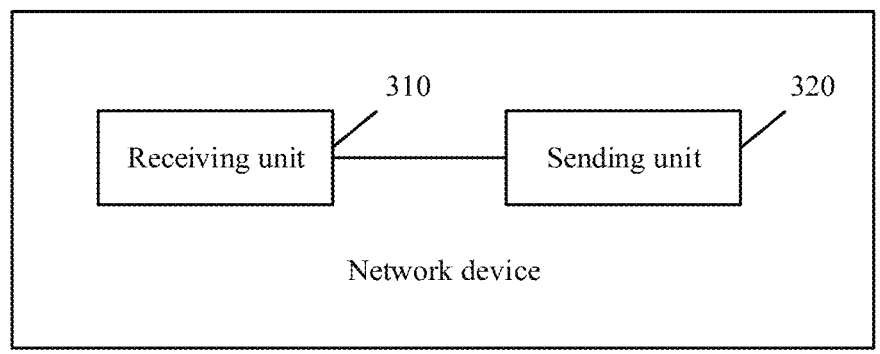
FIG. 9 is a schematic structural diagram of a network device according to an embodiment of this application.

FIG. 9 is a schematic structural diagram of a network device according to an embodiment of this application. As shown in FIG. 9, the network device may include a receiving unit 410 and a sending unit 420.

The receiving unit is configured to receive first indication information on a first uplink resource based on information about a spatial relation parameter.

The sending unit is configured to send link failure response information based on the first indication information.

The information about the spatial relation parameter is information about a spatial relation parameter used to send or receive a channel and/or a signal of a first cell; the first indication information indicates that a link failure occurs in a $i^{th}$ cell in N second cells, where N is an integer greater than or equal to 1, and i is an integer greater than or equal to 1 and less than or equal to N; and the first uplink resource is an uplink resource of the first cell.

In an optional implementation, the sending unit 410 is further configured to send first signaling, where the first signaling indicates a third uplink resource. The receiving unit is further configured to receive second indication information on the third uplink resource, where the second indication information indicates at least one of following: identification information of a $i^{th}$ cell, third reference signal information, and fourth reference signal information; and the third reference signal information is information about a reference signal whose channel quality is greater than or equal to a first threshold, and the fourth reference signal information is information about a reference signal whose channel quality is less than or equal to a second threshold.

That the sending unit 420 sends link failure response information based on the first indication information is specifically: sending the link failure response information based on the first indication information and the second indication information.

Similarly, in addition to the foregoing steps, the sending unit and/or the receiving unit in the network device shown in FIG. 9 may further perform, with reference to at least one of the implementations in the foregoing method embodiments, a related operation performed by the network device in the link failure recovery method in the embodiments of this application. Details are not described herein again.

Figure 10:
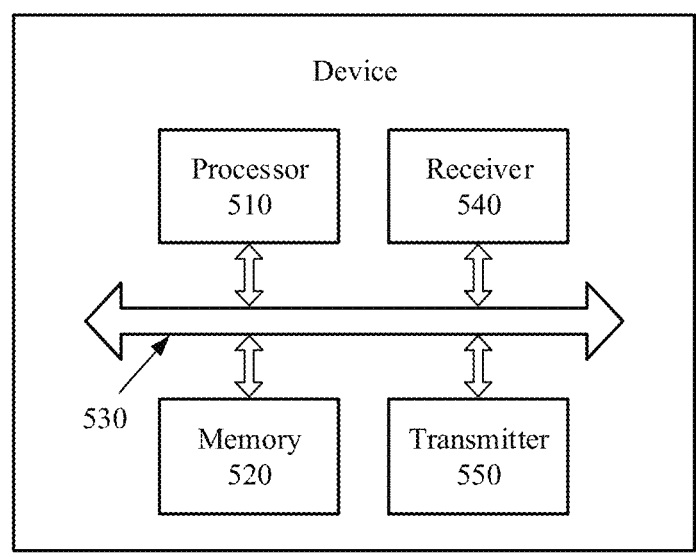
FIG. 10 is a schematic structural diagram of a device according to an embodiment of this application.

According to the foregoing method, FIG. 10 is a schematic structural diagram of a device according to an embodiment of this application. As shown in FIG. 10, the device may be the terminal device shown in FIG. 8, or may be a chip or a circuit, for example, a chip or a circuit that can be disposed in the terminal device. The device may correspond to a related operation performed by the terminal device in the foregoing method.

The device may include a processor 510 and a memory 520. The memory 520 is configured to store an instruction, and the processor 510 is configured to execute the instruction stored in the memory 520, to implement the steps performed by the terminal device, or implement related operations performed by the units in the terminal device shown in FIG. 8.

The device may further include a receiver 540 and a transmitter 550. The device may further include a bus system 530. The processor 510, the memory 520, the receiver 540, and the transmitter 550 may be connected by using the bus system 530.

The processor 510 is configured to execute the instruction stored in the memory 520, to control the receiver 540 to receive a signal and control the transmitter 550 to send a signal, so as to complete the steps performed by the terminal device in the foregoing method, for example, receive one or more pieces of data channel configuration information con-figured by the communications device, or send scrambled data. The receiver 540 and the transmitter 550 may be a same physical entity or different physical entities. When being the same physical entity, the receiver 540 and the transmitter 550 may be collectively referred to as a transceiver. The memory 520 may be integrated into the processor 510, or may be disposed separately from the processor 510.

In addition, the memory 520 is further used by the network device to configure a first uplink resource set and/or a second uplink resource set for the terminal device, and the like.

In an implementation, it may be considered that functions of the receiver 540 and the transmitter 550 are implemented by using a transceiver circuit or a dedicated transceiver chip. It may be considered that the processor 510 is implemented by using a dedicated processing chip, a processing circuit, a processor, or a general-purpose chip.

In another implementation, it may be considered that the terminal device provided in this embodiment of this application is implemented by using a general-purpose computer. To be specific, program code for implementing functions of the processor 510, the receiver 540, and the transmitter 550 is stored in the memory. A general-purpose processor implements the functions of the processor 510, the receiver 540, and the transmitter 550 by executing the code in the memory. For example, the processor 510 invokes the program code in the memory 520, to perform the following operation:

send first indication information on a first uplink resource based on information about a spatial relation parameter.

The information about the spatial relation parameter is information about a spatial relation parameter used to send or receive a channel and/or a signal of a first cell; the first indication information indicates that a link failure occurs in a $i^{th}$ cell in N second cells, where N is an integer greater than or equal to 1, and i is an integer greater than or equal to 1 and less than or equal to N; and the first uplink resource is an uplink resource of the first cell.

In an optional implementation, the processor 510 invokes the program code in the memory 520, and may further perform the following operations:

receive first signaling, where the first signaling indicates a third uplink resource; and send second indication information on the third uplink resource, where the second indication information indicates at least one of following: identification information of a $i^{th}$ cell, third reference signal information, and fourth reference signal information.

The third reference signal information is information about a reference signal whose channel quality is greater than or equal to a first threshold, and the fourth reference signal information is information about a reference signal whose channel quality is less than or equal to a second threshold.

In an optional implementation, the processor 510 invokes the program code in the memory 520, and may further perform another operation performed by the terminal device in the foregoing method embodiment. In other words, for concepts, explanations, detailed descriptions, and other steps that are related to the technical solutions provided in the embodiments of this application and that are related to the device, refer to the descriptions about the content in the foregoing method or other embodiments. Details are not described herein again.

Figure 11:
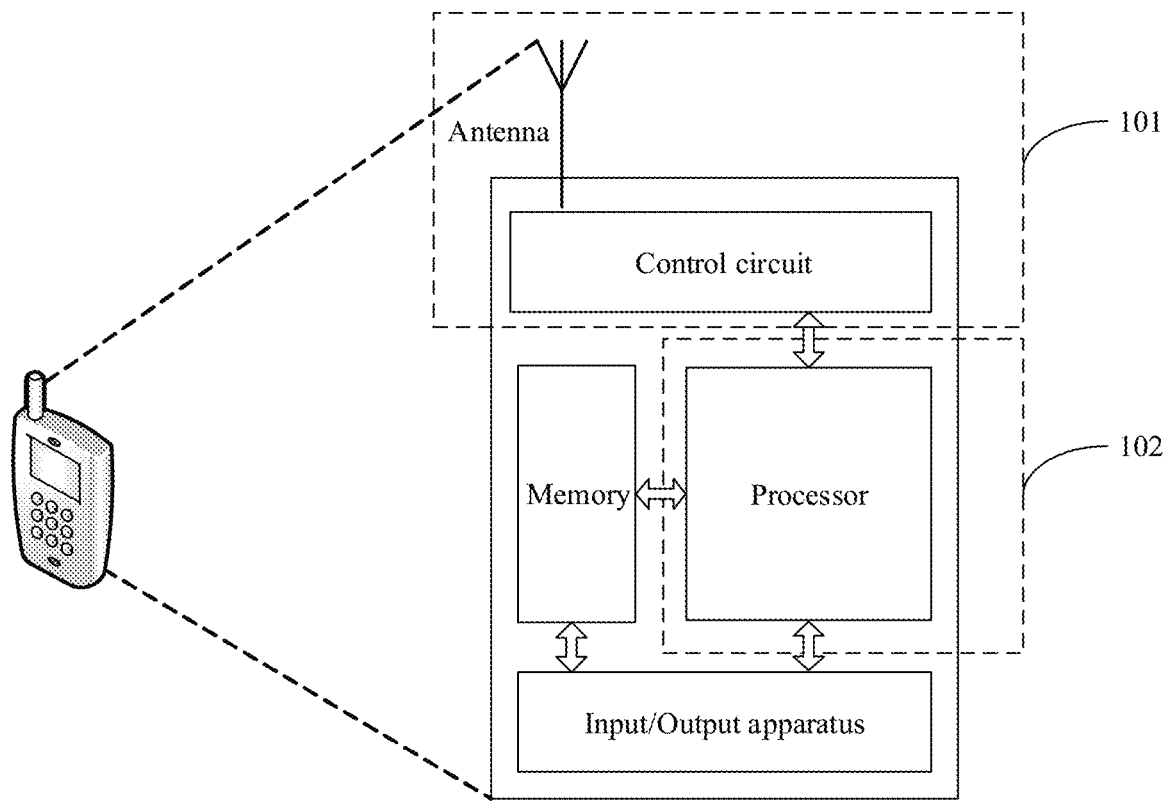
FIG. 11 is a schematic structural diagram of another terminal device according to an embodiment of this application.

FIG. 11 is a schematic structural diagram of a terminal device according to an embodiment of this application. The terminal device may be applied to the system shown in FIG. 1. For ease of description, FIG. 11 shows only main components of the terminal device. As shown in FIG. 11, the terminal device 11 includes a processor, a memory, a control circuit, an antenna, and an input/output apparatus. The processor is mainly configured to: process a communications protocol and communication data, control the entire terminal device, execute a software program, and process data of the software program. For example, the processor is configured to support the terminal device in performing an action described in the embodiment of the foregoing data scrambling method. The memory is mainly configured to store a software program and data, for example, store the first uplink resource set and/or the second uplink resource set described in the foregoing embodiments. The control circuit is mainly configured to: perform conversion between a baseband signal and a radio frequency signal, and process the radio frequency signal. The control circuit together with the antenna may also be referred to as a transceiver, and the transceiver is mainly configured to: receive and send a radio frequency signal in a form of an electromagnetic wave, for example, receive related information configured by a communications device, receive data sent by a network device, and send uplink data. The input/output apparatus, for example, a touchscreen, a display, or a keyboard, is mainly configured to: receive data that is input by a user and output data to the user.

After the terminal device is powered on, the processor may read a software program in a storage unit, interpret and execute an instruction of the software program, and process data of the software program, for example, perform a related operation performed by the terminal device in the foregoing method embodiment. In a process of performing the related operation performed by the terminal device in the foregoing method embodiment, when the processor needs to wirelessly send data, after performing baseband processing on the to-be-sent data, the processor outputs a baseband signal to a radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and only one processor. An actual terminal device may include a plurality of processors and a plurality of memories. The memory may also be referred to as a storage medium, a storage device, or the like. This is not limited in this embodiment of the present disclosure.

In an optional implementation, the processor may include a baseband processor and a central processing unit. The baseband processor is mainly configured to process the communications protocol and the communication data. The central processing unit is mainly configured to: control the entire terminal device, execute the software program, and process the data of the software program. The processor in FIG. 11 is integrated with functions of the baseband processor and the central processing unit. A person skilled in the art may understand that the baseband processor and the central processing unit may alternatively be independent processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

For example, in this embodiment of the present disclosure, the antenna having a transceiver function and the control circuit may be considered as a communications unit or a transceiver unit of the terminal device, and the processor having a processing function may be considered as a determining unit or a processing unit of the terminal device. As shown in FIG. 11, the terminal device includes a transceiver unit 101 and a processing unit 102. The transceiver unit may also be referred to as a transceiver, a transceiver machine, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver, a receiver, a receiving circuit, or the like, and the sending unit may be referred to as a transmitter, a transmitter, a transmitting circuit, or the like.

Figure 12:
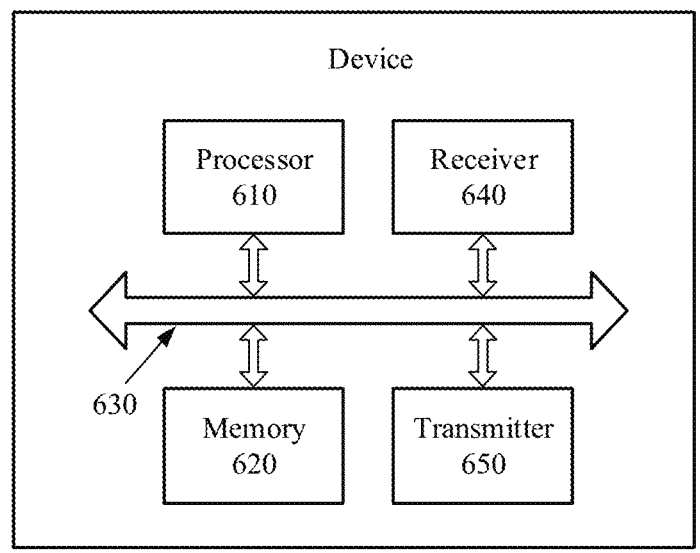
FIG. 12 is a schematic structural diagram of another device according to an embodiment of this application.

According to the foregoing method, FIG. 12 is a schematic structural diagram of another device according to an embodiment of this application. As shown in FIG. 12, the device may be the network device shown in FIG. 9. The device may alternatively be a chip or a circuit, for example, a chip or a circuit that can be disposed in the network device shown in FIG. 9. The device performs a related operation performed by the network device in the foregoing method. The device may include a processor 610 and a memory 620. The memory 620 is configured to store an instruction, and the processor 610 is configured to execute the instruction stored in the memory 620, so that the device implements the related operation performed by the network device, for example, a scrambling identifier configuration method and/or a data scrambling method.

The network may further include a receiver 640 and a transmitter 650. The network may still further include a bus system 630.

The processor 610, the memory 620, the receiver 640, and the transmitter 650 are connected by using the bus system 630. The processor 610 is configured to execute the instruction stored in the memory 620, to control the receiver 640 to receive a signal and control the transmitter 650 to send a signal, so as to complete the steps performed by the network device in the foregoing method. The receiver 640 and the transmitter 650 may be a same physical entity or different physical entities. When being the same physical entity, the receiver 640 and the transmitter 650 may be collectively referred to as a transceiver. The memory 620 may be integrated into the processor 610, or may be disposed separately from the processor 610.

In an implementation, it may be considered that functions of the receiver 640 and the transmitter 650 are implemented by using a transceiver circuit or a dedicated transceiver chip. It may be considered that the processor 610 is implemented by using a dedicated processing chip, a processing circuit, a processor, or a general-purpose chip.

In another implementation, it may be considered that a communications device or the network device provided in this embodiment of this application is implemented by using a general-purpose computer. To be specific, program code for implementing functions of the processor 610, the receiver 640, and the transmitter 650 is stored in the memory. A general-purpose processor implements the functions of the processor 610, the receiver 640, and the transmitter 650 by executing the code in the memory. For example, the processor 610 may invoke the program code in the memory 620, or perform, based on the receiver 640 and the transmitter 650, related operations performed by a configuration unit, the sending unit, and the like in the embodiment shown in FIG. 9, or may perform related operations performed by the determining unit and the processing unit in the embodiment shown in FIG. 10, or may perform related operations or implementations performed by the network devices in the foregoing method embodiment.

For concepts, explanations, detailed descriptions, and other steps that are related to the technical solutions provided in the embodiments of this application and that are related to the device, refer to the descriptions about the content in the foregoing method or other embodiments. Details are not described herein again.

Figure 13:
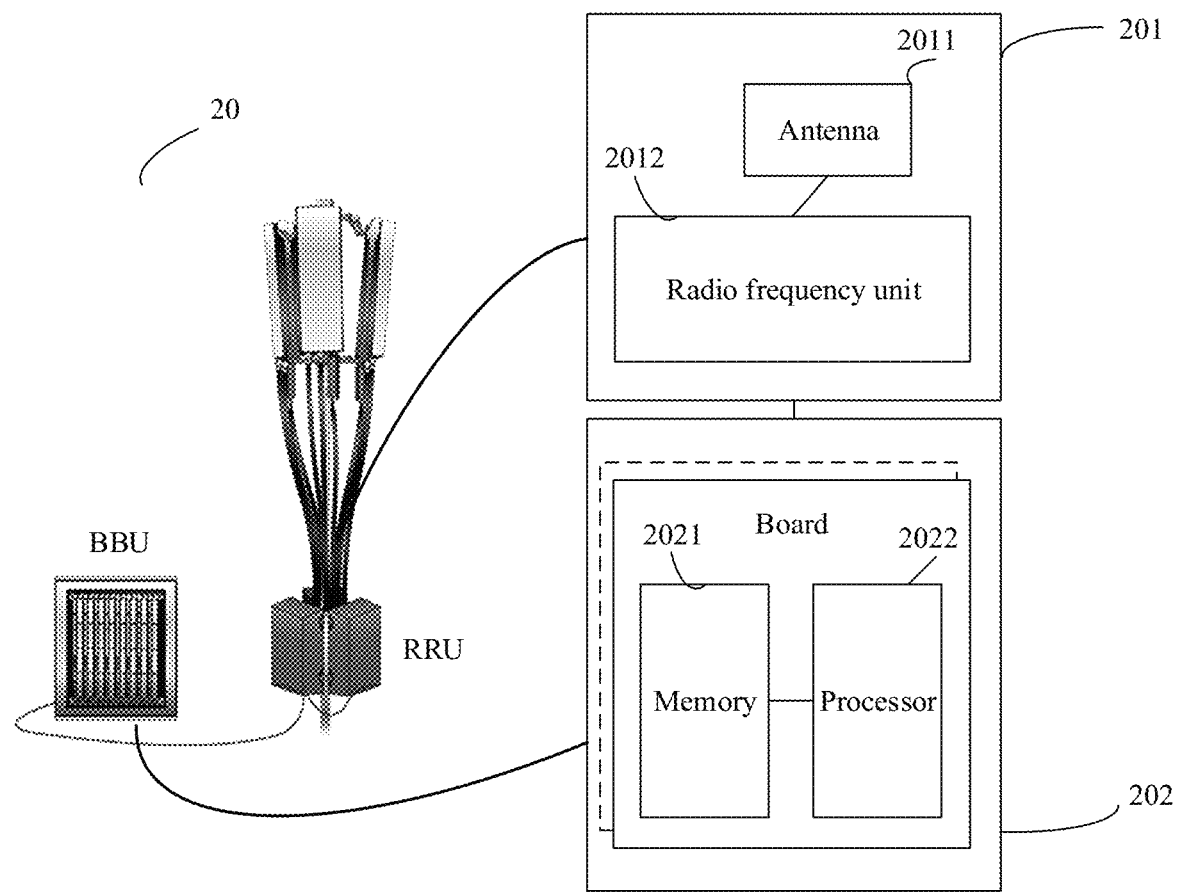
FIG. 13 is a schematic structural diagram of another network device according to an embodiment of this application.

FIG. 13 is a schematic structural diagram of a network device according to an embodiment of this application. The network device may be a base station, and can send related control information and configuration information to a terminal device, receive and send data, and the like. A structure of the base station is used as an example in FIG. 13 for description. As shown in FIG. 13, the base station may be applied to the system shown in FIG. 1. The base station includes one or more radio frequency units, such as a remote radio unit (RRU) 201 and one or more baseband units (BBU) (which may also be referred to as a digital unit (DU)) 202. The RRU 201 may be referred to as a transceiver unit, a transceiver machine, a transceiver circuit, a transceiver, or the like, and may include at least one antenna 2011 and a radio frequency unit 2012. The RRU 201 is mainly configured to: receive and send radio frequency signals, and perform conversion between a radio frequency signal and a baseband signal. For example, the RRU 201 is configured to send the link failure response information in the foregoing embodiment to the terminal device. The BBU 202 is mainly configured to: perform baseband processing, control the base station, and the like. The RRU 201 and the BBU 202 may be physically disposed together, or may be physically separated, namely, a distributed base station.

The BBU 202 is a control center of the base station, and is also referred to as a processing unit, mainly configured to implement a baseband processing function such as channel encoding, multiplexing, modulation, or spreading. For example, the BBU (processing unit) may be configured to control the base station to perform an operation procedure related to the network device in the foregoing method embodiment.

In an example, the BBU 202 may include one or more boards. A plurality of boards may jointly support a radio access network (for example, an LTE network) in a single access standard, or may separately support radio access networks in different access standards. The BBU 202 further includes a memory 2021 and a processor 2022. The memory 2021 is configured to store a necessary instruction and data. For example, the memory 2021 stores the first uplink resource set and/or the second uplink resource set in the foregoing embodiment, and the like. The processor 2022 is configured to control the base station to perform a necessary action, for example, is configured to control the base station to perform an operation procedure related to the network device in the foregoing method embodiment. The memory 2021 and the processor 2022 may serve the one or more boards. In other words, a memory and a processor may be separately disposed on each board. Alternatively, a plurality of boards may share a same memory and a same processor. In addition, a necessary circuit may be further disposed on each board.

According to the method provided in the embodiments of this application, an embodiment of this application further provides a communications system, including the foregoing one or more network devices and one or more terminal devices.

It should be understood that in the embodiments of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory may include a read-only memory and a random access memory, and provide an instruction and data for the processor. A part of the memory may further include a nonvolatile random access memory.

The bus system may further include a power bus, a control bus, a status signal bus, and the like, in addition to a data bus. However, for clear description, various types of buses in the figure are marked as the bus system.

In an implementation process, the steps in the foregoing methods may be completed by using a hardware integrated logic circuit in the processor or an instruction in a form of software. The steps in the methods disclosed with reference to the embodiments of this application may be directly performed and completed by a hardware processor, or may be performed and completed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "I" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present disclosure.

A person of ordinary skill in the art may be aware that illustrative logical blocks and steps described with reference to the embodiments disclosed in this specification may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of the present disclosure may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:

sending, by a terminal device, first indication information on a first uplink resource, wherein the first indication information indicates that in N second cells there is at least one cell in which a link failure occurs, wherein N is an integer greater than or equal to 1, and wherein the first uplink resource is an uplink resource of a first cell;

receiving, by the terminal device, first signaling that indicates a third uplink resource; and sending, by the terminal device, second indication information on the third uplink resource, wherein the second indication information indicates at least one of following:

identification information of a $i^{th}$ cell in which a link failure occurs in the N second cells, third reference signal information, or fourth reference signal information;

wherein the third reference signal information is information about a reference signal whose channel quality is greater than or equal to a first threshold, and the fourth reference signal information is information about a reference signal whose channel quality is less than or equal to a second threshold;

wherein the first uplink resource is a physical random access channel (PRACH) resource in a second uplink resource set or a physical uplink control channel (PUCCH) resource in the second uplink resource set, and the second uplink resource set is a set of M PRACH resources or a set of M PUCCH resources that are configured for the N second cells on the uplink resource of the first cell and that are used to send link failure recovery request information;

wherein N is greater than M, and one PRACH resource in the second uplink resource set or one PUCCH resource in the second uplink resource set corresponds to one of P second cell groups, wherein the N second cells comprise the P second cell groups, and one second cell group comprises one or more second cells, wherein P is an integer greater than or equal to 1 and less than N; and wherein the first uplink resource is a PRACH resource that is in the second uplink resource set and that corresponds to a second cell group to which a $i^{th}$ cell belongs, or the first uplink resource is a PUCCH resource that is in the second uplink resource set and that corresponds to a second cell group to which a $i^{th}$ cell belongs.

2. The method according to claim 1, wherein the sending, by the terminal device, the first indication information on the first uplink resource comprises:

sending, by the terminal device, the first indication information on the first uplink resource based on information about a spatial relation parameter, wherein the information about the spatial relation parameter is information about a spatial relation parameter used to send or receive a channel or a signal of the first cell.

3. The method according to claim 1, wherein the first uplink resource is a physical uplink control channel (PUCCH) resource that is configured on the uplink resource of the first cell and that is used to send link failure recovery request information of the N second cells.

4. The method according to claim 1, wherein the third uplink resource is a physical uplink shared channel (PUSCH) resource or a physical random access channel (PRACH) resource.

5. An apparatus, comprising:
a transceiver, configured to:
send first indication information on a first uplink resource, wherein the first indication information indicates that in N second cells there is at least one cell in which a link failure occurs, wherein N is an integer greater than or equal to 1, and wherein the first uplink resource is an uplink resource of a first cell;
receive first signaling that indicates a third uplink resource; and
send second indication information on the third uplink resource, wherein the second indication information indicates at least one of following: identification information of a cell in which a link failure occurs in the N second cells, third reference signal information, or fourth reference signal information;
wherein the third reference signal information is information about a reference signal whose channel quality is greater than or equal to a first threshold, and the fourth reference signal information is information about a reference signal whose channel quality is less than or equal to a second threshold;
wherein the first uplink resource is a PRACH resource in a second uplink resource set or a PUCCH resource in the second uplink resource set, and the second uplink resource set is a set of M PRACH resources or a set of M PUCCH resources that are configured for the N second cells on the uplink resource of the first cell and that are used to send link failure recovery request information;
wherein N is greater than M, and one PRACH resource in the second uplink resource set or one PUCCH resource in the second uplink resource set corresponds to one of P second cell groups, wherein the N second cells comprise the P second cell groups, and one second cell group comprises one or more second cells, wherein P is an integer greater than or equal to 1 and less than N; and
wherein the first uplink resource is a PRACH resource that is in the second uplink resource set and that corresponds to a second cell group to which a $i^{th}$ cell belongs, or the first uplink resource is a PUCCH resource that is in the second uplink resource set and that corresponds to a second cell group to which a $i^{th}$ cell belongs.

6. The apparatus according to claim 5, wherein the transceiver is further configured to:
send the first indication information on the first uplink resource based on information about a spatial relation parameter, wherein the information about the spatial relation parameter is information about a spatial relation parameter used to send or receive a channel or a signal of the first cell.

7. The apparatus according to claim 5, wherein the first uplink resource is a physical uplink control channel (PUCCH) resource that is configured on the uplink resource of the first cell and that is used to send link failure recovery request information of the N second cells.

8. The apparatus according to claim 5, wherein the third uplink resource is a physical uplink shared channel (PUSCH) resource or a physical random access channel (PRACH) resource.

9. A method, comprising:
receiving, by a network device, first indication information on a first uplink resource, wherein the first indication information indicates that in N second cells there is at least one cell in which a link failure occurs, wherein N is an integer greater than or equal to 1, and wherein the first uplink resource is an uplink resource of a first cell;
sending, by the network device, first signaling that indicates a third uplink resource;
receiving, by the network device, second indication information on the third uplink resource, wherein the second indication information indicates at least one of following:
identification information of a $i^{th}$ cell, third reference signal information, or fourth reference signal information, wherein the third reference signal information is information about a reference signal whose channel quality is greater than or equal to a first threshold, and the fourth reference signal information is information about a reference signal whose channel quality is less than or equal to a second threshold; and
sending, by the network device, link failure response information based on the first indication information and the second indication information;
wherein the first uplink resource is a PRACH resource in a second uplink resource set or a PUCCH resource in the second uplink resource set, and the second uplink resource set is a set of M PRACH resources or a set of M PUCCH resources that are configured for the N second cells on the uplink resource of the first cell and that are used to send link failure recovery request information, wherein M is an integer greater than or equal to 1 and less than or equal to N;
wherein N is greater than M, and one PRACH resource in the second uplink resource set or one PUCCH resource in the second uplink resource set corresponds to one of P second cell groups, wherein the N second cells comprise the P second cell groups, and one second cell group comprises one or more second cells, wherein P is an integer greater than or equal to 1 and less than N; and
wherein the first uplink resource is a PRACH resource that is in the second uplink resource set and that corresponds to a second cell group to which a $i^{th}$ cell belongs, or the first uplink resource is a PUCCH resource that is in the second uplink resource set and that corresponds to a second cell group to which a $i^{th}$ cell belongs.

10. The method according to claim 9, wherein the receiving, by the network device, the first indication information on the first uplink resource comprises:
receiving, by the network device, the first indication information on the first uplink resource based on information about a spatial relation parameter, wherein the information about the spatial relation parameter is information about a spatial relation parameter used to send or receive a channel or a signal of the first cell.

11. The method according to claim 9, wherein the first uplink resource is a physical uplink control channel (PUCCH) resource that is configured on the uplink resource of the first cell and that is used to send link failure recovery request information of the N second cells.

12. An apparatus, comprising:
a transceiver, configured to:
  receive first indication information on a first uplink resource, wherein the first indication information indicates that in N second cells there is at least one cell in which a link failure occurs, wherein N is an integer greater than or equal to 1, and wherein the first uplink resource is an uplink resource of a first cell;
  send first signaling that indicates a third uplink resource;
  receive second indication information on the third uplink resource, wherein the second indication information indicates at least one of following: identification information of a $i^{th}$ cell, third reference signal information, or fourth reference signal information, wherein the third reference signal information is information about a reference signal whose channel quality is greater than or equal to a first threshold, and the fourth reference signal information is information about a reference signal whose channel quality is less than or equal to a second threshold; and
  send link failure response information based on the first indication information and the second indication information;
wherein the first uplink resource is a physical random access channel (PRACH) resource in a second uplink resource set or a physical uplink control channel (PUCCH) resource in the second uplink resource set, and the second uplink resource set is a set of M PRACH resources or a set of M PUCCH resources that are configured for the N second cells on the uplink resource of the first cell and that are used to send link failure recovery request information, wherein M is an integer greater than or equal to 1 and less than or equal to N;
wherein N is greater than M, and one PRACH resource in the second uplink resource set or one PUCCH resource in the second uplink resource set corresponds to one of P second cell groups, wherein the N second cells comprise the P second cell groups, and one second cell group comprises one or more second cells, wherein P is an integer greater than or equal to 1 and less than N; and
wherein the first uplink resource is a PRACH resource that is in the second uplink resource set and that corresponds to a second cell group to which a $i^{th}$ cell belongs, or the first uplink resource is a PUCCH resource that is in the second uplink resource set and that corresponds to a second cell group to which a $i^{th}$ cell belongs.

* * * * *

UNITED STATES PATENT AND TRADEMARK OFFICE
CERTIFICATE OF CORRECTION

PATENT NO. : 11,855,740 B2
APPLICATION NO. : 17/174041
DATED : December 26, 2023
INVENTOR(S) : Zhang et al.

It is certified that error appears in the above-identified patent and that said Letters Patent is hereby corrected as shown below:

In the Claims

Claim 5: Column 51, Line 30: "information of a cell in which a link failure occurs in" should read -- information of a $i^{th}$ cell in which a link failure occurs in --.

Signed and Sealed this
Nineteenth Day of March, 2024

Katherine Kelly Vidal
*Director of the United States Patent and Trademark Office*